United States Patent [19]

Takasu et al.

[11] Patent Number: 5,500,725
[45] Date of Patent: Mar. 19, 1996

[54] ORIGINAL DOCUMENT READING DEVICE CAPABLE OF AUTOMATICALLY DETECTING THE SIZE OF AN ORIGINAL DOCUMENT

[75] Inventors: Akira Takasu, Toyokawa; Tatsuya Eguchi, Toyohashi, both of Japan

[73] Assignee: Minolta Co., Ltd., Osaka, Japan

[21] Appl. No.: 313,345

[22] Filed: Sep. 27, 1994

[30] Foreign Application Priority Data

| Sep. 28, 1993 | [JP] | Japan | 5-241841 |
| Feb. 28, 1994 | [JP] | Japan | 6-030707 |
| Mar. 10, 1994 | [JP] | Japan | 6-039485 |
| Jul. 19, 1994 | [JP] | Japan | 6-167197 |
| Jul. 19, 1994 | [JP] | Japan | 6-167198 |

[51] Int. Cl.⁶ .......... H04N 1/00; G03G 15/00
[52] U.S. Cl. .......... 355/311; 250/559.24; 358/449; 364/562
[58] Field of Search .......... 355/203, 311, 355/75; 250/559.24; 560, 561; 356/9; 358/449; 364/562

[56] References Cited

U.S. PATENT DOCUMENTS

| 4,568,181 | 2/1986 | Nishiyama | 355/75 |
| 4,585,332 | 4/1986 | Shenoy | 355/14 R |
| 4,698,511 | 10/1987 | Sueda et al. | 250/560 |
| 4,713,550 | 12/1987 | Anzai et al. | 250/560 |
| 4,929,844 | 5/1990 | Houjiyou et al. | 250/559.24 |
| 5,225,688 | 7/1993 | Endo | 355/311 X |

FOREIGN PATENT DOCUMENTS 4-66968  3/1992  Japan.

*Primary Examiner*—Joan H. Pendegrass
*Attorney, Agent, or Firm*—Willian Brinks Hofer Gilson & Lione

[57] ABSTRACT

A document reading device comprises a plurality of distances sensors for measuring the distance as for each certain position of an original document table, an original document size detection CPU 1 for comparing information about the distance measured by the plurality of distance sensors with preset threshold value to detect if an original document is disposed on the certain position, then deciding the size of the original document size disposed on the original document table according to the detected result and transmitting original document size data, and a main unit control CPU 2 for taking in the original document size data from the original document size detection CPU 1 to control the reading of the original document.

29 Claims, 37 Drawing Sheets

| | original document size | detection position | | | |
|---|---|---|---|---|---|
| | | standard ① ② ③ | option ④ ⑤ | standard ⑥ ⑦ | option ⑧ |
| standard detection size | A3T | ○ ○ ○ | ○ ○ | ○ ○ | ○ |
| | B4T | ○ ○ ○ | ○ ○ | ○ × | × |
| | A4T | ○ ○ ○ | ○ × | × × | × |
| | B5T | ○ ○ × | × × | × × | × |
| | A4Y | ○ × × | × × | ○ ○ | ○ |
| | B5Y | × × × | × × | ○ × | × |
| | A5T | ○ × × | × × | × × | × |
| option | 11 * 17 | ○ ○ ○ | ○ ○ | ○ ○ | × |
| | legal(8.5 * 14) | ○ ○ ○ | ○ ○ | × × | × |
| | letterT(8.5 * 11) | ○ ○ ○ | × × | × × | × |
| | letterY(8.5 * 11) | ○ × × | × × | ○ ○ | × |

| original document size | detection position | | | | |
|---|---|---|---|---|---|
| | ① | ② | ③ | ⑥ | ⑦ |
| A3T | ○ | ○ | ○ | ○ | ○ |
| B4T | ○ | ○ | ○ | ○ | × |
| 8.5 * 13 | ○ | ○ | ○ | × | × |
| A4T | ○ | ○ | × | × | × |
| A4Y | ○ | × | × | ○ | ○ |
| A5T | ○ | × | × | × | × |

| original document size | detection position | | | | | | | |
|---|---|---|---|---|---|---|---|---|
| | ① | ② | ③ | ④ | ⑤ | ⑥ | ⑦ | ⑧ |
| A3T | O | O | O | O | O | O | O | O |
| B4T | O | O | O | O | O | O | X | X |
| A4T | O | O | O | O | X | X | X | X |
| B5T | O | O | O | X | X | X | X | X |
| A4Y | O | X | X | X | X | O | O | O |
| B5Y | X | X | X | X | X | O | X | X |
| A5T | O | X | X | X | X | X | X | X |
| 11 * 17 | O | O | O | O | O | O | O | X |
| legal(8.5 * 14) | O | O | O | O | O | X | X | X |
| letterT(8.5 * 11) | O | O | O | X | X | X | X | X |
| letterY(8.5 * 11) | O | X | X | X | X | O | O | X |

Fig. 12

| original document size | original document size code ||||
|---|---|---|---|---|
| | DATA0 | DATA1 | DATA2 | DATA3 |
| A3T | ○ | ○ | ○ | ○ |
| B4T | ○ | ○ | ○ | × |
| A4T | ○ | ○ | × | ○ |
| B5T | ○ | ○ | × | × |
| A4Y | ○ | × | ○ | ○ |
| B5Y | ○ | × | ○ | × |
| A5T | ○ | × | × | ○ |
| 11 * 17 | ○ | × | × | × |
| 8.5 * 14 | × | ○ | ○ | ○ |
| FLS(8.5 * 13) | × | ○ | ○ | × |
| letter T(8.5 * 11) | × | ○ | × | ○ |
| letter Y(8.5 * 11) | × | ○ | × | × |
| — | × | × | ○ | ○ |
| — | × | × | ○ | × |
| no paper | × | × | × | ○ |
| sensor error code | × | × | × | × |

Fig. 14a

| defect sensor No. | code 3 2 1 | 0 |
|---|---|---|
| initial error A | × × × | ○ |
| 1 | × × ○ | ○ |
| 2 | × ○ × | ○ |
| 1, 2 | × ○ ○ | ○ |
| 3 | ○ × × | ○ |
| 1, 3 | ○ × ○ | ○ |
| 2, 3 | ○ ○ × | ○ |
| 1, 2, 3 | ○ ○ ○ | ○ |

Fig. 14b

| defect sensor No. | code 3 2 1 | 0 |
|---|---|---|
| — | × × × | × |
| 4 | × × ○ | × |
| 5 | × ○ × | × |
| 4, 5 | × ○ ○ | × |
| — | ○ × × | × |
| — | ○ × ○ | × |
| (shortage of measuring time) | ○ ○ × | × |
| initial error B | ○ ○ ○ | × |

Fig. 25

(1)
| initial mode |
|---|
| option ← no option |
| start key PUSH |

(2)
| initial mode |
|---|
| please close original cover |

(3)
| initial mode |
|---|
| during initial processing |

(4)
| initial mode |
|---|
| original cover is opened during initial processing; please re-start initial processing |

(5)
| initial mode |
|---|
| sensor error occurs sensor NO. □□ no initial processing is possible |

(6)
| initial mode |
|---|
| board or harness is out of order; no initial processing is possible |

(7)
| initial mode |
|---|
| initial processing is completed |

(8)
| initial mode |
|---|
| initial processing error occurs; no initial processing is possible |

(9)
| initial mode |
|---|
| error occurs in initial signal line; no initial processing is possible |

(10)
| original document size detection · initial processing |
|---|
| please do not open original cover |

5,500,725

ORIGINAL DOCUMENT READING DEVICE CAPABLE OF AUTOMATICALLY DETECTING THE SIZE OF AN ORIGINAL DOCUMENT

BACKGROUND OF THE INVENTION

1. Field of the Invention

The present invention relates to an original document reading device employed by a copy machine or the like, particularly to an original document reading device which is capable of automatically detecting the size of an original document.

2. Description of Related Art

Generally, an original document reading device constructed in copy machines or the like can detect the size of original documents automatically. According to detected document size, the size of copy sheet to be supplied is selected with a copy machine.

According to a general method of detecting document size, an original document reading device has a plurality of reflective photo sensors beneath an original document table, and it detects document size according to the light intensity sensed by each photo sensor.

For example, Japanese Laid-Open Patent Application No. 4-66968 discloses a copy machine which has a plurality of photo sensors each consisting of a light emitter and a light sensor which are positioned beneath an original document table. Electric signal is outputted according to the light intensity sensed by the light sensor of each photo sensor, and it is inputted to an input port of a main unit control CPU for controlling the operation of the copy machine. The main unit control CPU detects state of electric signal inputted from each photo sensor, detects the size of an original document, and controls the copy machine according to detected original document size.

However, this method of detecting original document size from the light intensity sensed by each light sensor has the following problem. The light intensity sensed by each light sensor is easily influenced by the light intensity from the light emitter which changes as time passes or by the density of an original document disposed on the document table. Therefore, accuracy of detecting original document size is degraded in a long period.

Also, as set forth above, original document size is generally detected by a control program for main unit control CPU. Therefore, if the number of different document sizes is changed, not only the number of photo sensors but also control program must be adjusted. Once a copy machine is completed and is put on a market; however, original document size which can be detected by the copy machine cannot be modified any longer. For this reason, use of a copy machine is limited.

SUMMARY OF THE INVENTION

It is a first object of the present invention to provide an original document reading device which is capable of detecting the size of an original document precisely in a long period.

The first object may be fulfilled by an original document reading device comprising a transparent original document table which has an area onto which an original document is disposed, a reading unit for reading an image of the original document disposed on the original document table, a plurality of distance sensors each for measuring distance as for a certain position of the original document table which corresponds to size of the original document disposed on the original document table, then outputting measuring value, a threshold value setting unit for setting threshold value according to the measuring value from each distance sensor, an original document size deciding unit for comparing the measuring value from each distance sensor with the threshold value set by the threshold value setting unit, and deciding the size of the original document disposed on the original document table according to data representing the compared result, and a reading controlling unit for controlling the reading of the reading unit according to the decided result from the original document size deciding unit.

In this construction, a plurality of distance sensors detect distance as for each preset position of the original document table; the original document detecting unit detects the presence or absence of an original document at each preset position of the original document table according to information indicative of the distance detected by the plurality of distance sensors; and the original document size deciding unit decides the size of an original document disposed on the original document table according to the deciding result of the original document detecting unit.

The distance information measured by each distance sensor is based on a position of the light sensing element where the light is sensed, and it is hardly influenced by change of the light emitting element which takes place as time passes or the density of an original document on the original document table. Therefore, original document size can be detected accurately for a long time. Compared to conventional mechanism for detecting original document size according to the light intensity, efficiency which is measured by the life time of a sensor and the tolerance of floating of an original document is improved greatly.

It is a second object of the present invention to provide an original document reading device which is capable of changing the number of different original document sizes and the number of original document size detectors to detect differently sized original documents without afflicting control of original document reading.

Each distance sensor may be disposed to measure distance in a direction which is diagonal to the original document table.

The original document reading device may further comprise an original cover one end of which is attached to one end of the original document table by an axis to enable itself to open and close to the original document table, wherein at least one of the plurality of distance sensors measures distance to the original document table diagonally in a direction being away from the axis.

The original document reading device may further comprise an original cover one end of which is attached to one end of the original document table to enable itself to open and close to the original document table by an axis, wherein the reading unit comprises an optical system which moves along with the original document table, and at least one of the plurality of distance sensors is disposed outside a migration range of the optical system and measures distance to the original document table diagonally in the direction being toward the migration range of the optical system.

The original document reading device may further comprise an original cover one end of which is attached to one end of the original document table by an axis to enable itself to open and close to the original document table, wherein each distance sensor comprises a plurality of emitting elements and a single sensing element; and the original document size deciding unit decides the size of the original document according to distance information from the plurality of distances sensors at least one of which employs the sensed result of the sensing elements when light is transmitted from the emitting element located the farthest to the axis of the original cover among the plurality of emitting elements.

The original document reading device may further comprise an original document size decision forbidding unit for forbidding the deciding operation of the original document size deciding unit when the measuring value from any distance sensor exceeds a predetermined value.

The original document reading device may further comprise an original cover which is disposed to enable itself to open and close to the original document table, an original cover open and close detecting unit for detecting whether the original cover is opened or closed to the original document table, and a threshold value setting forbidding unit for forbidding the threshold value setting of the threshold value setting unit when the original cover open and close detecting unit detects that the original cover is opened.

The original document reading device may further comprise a notifying unit for notifying the opening of the original cover when the original cover open and close detecting unit detects that the original cover is opened.

The threshold value setting forbidding unit may further forbid the threshold value setting of the threshold value setting unit when at least one of the measuring values from the plurality of the distance sensors exceeds a standard value.

The original document reading device may further comprise a reading forbidding unit for forbidding the reading of the reading unit while the threshold value setting unit is changing the setting of threshold value.

The original document reading device may further comprise a threshold value setting forbidding unit for forbidding the threshold value setting during the reading operation of the reading unit.

The original document reading device may further comprise a measuring value storing unit for storing each measuring value of the plurality of distance sensors when the threshold setting unit sets the threshold value, a measuring value comparing unit for comparing each measuring value which is newly outputted from the plurality of distance sensors with each measuring value stored in the storing means, and a threshold value setting controlling unit for controlling the threshold value setting unit to set threshold value and controlling the measuring value storing unit to replace the measuring value stored in the storing unit with the measuring value which is newly outputted only when the compared result from the measuring value comparing unit represents a difference which is greater than a predetermined level.

The original document reading device may further comprise a measuring value storing unit for storing the measuring values from the plurality of distance sensor which repeat the measuring a plurality of times, wherein the threshold value setting unit sets the threshold value according to the predetermined number of measuring values stored in the measuring value storing unit.

The measuring value storing unit may store only the measuring value which is within a predetermined range from the measuring values from the plurality of distance sensor which repeat the measuring the plurality of times.

The original document reading device may further comprise an original document detecting unit for detecting if an original document is disposed on the original document table, and a threshold value setting controlling unit for controlling the threshold value setting unit to set threshold value unless the original document detecting unit detects that an original document is disposed on the original document table.

The original document reading device may further comprise a threshold value setting directing unit for directing the threshold value setting unit to set threshold value whenever the reading unit completes the reading a predetermined time.

The original document reading device may further comprise an original cover which is disposed to enable itself to open and close to the original document table, a second distance sensor which is disposed to face to the original cover for measuring distance to the original cover, and an original cover opening amount detecting unit for detecting opening amount of the original cover according to information about the distance measured by the second distance sensor, wherein the reading controlling unit controls the reading of the reading unit according to the opening amount of the original cover detected by the original cover opening amount detecting unit.

The original document reading device may further comprise an original cover which is disposed to enable itself to open and close to the original document table, and an original cover opening amount detecting unit for detecting opening amount of the original cover according to information about the distance measured by the plurality of distance sensors, wherein the reading controlling unit controls the reading of the reading unit according to the opening amount of the original cover detected by the original cover opening amount detecting unit.

The original document reading device may further comprise an original cover which is disposed to enable itself to open and close to the original document table, and an original cover opening amount detecting unit for detecting opening amount of the original cover, and a distance measuring halt unit for halting the distance measuring of the distance sensors when the original cover opening amount detecting unit detects that the original cover is closed by more than predetermined amount, wherein the reading controlling unit takes in the size of the original document decided by the original document size deciding unit when the original cover opening amount detecting unit detects that the original cover is opened by more than predetermined amount.

The original document size deciding unit may decide the size of the original document disposed on the original document table as a maximum of predetermined original document size when every measuring value from the plurality of distance sensors exceeds standard value.

An original document reading device may comprising a transparent original document table which has an area onto which an original document is disposed, an original cover which is disposed to enable itself to open and close to the original document table, an original cover open and close detecting unit for detecting whether the original cover is opened or closed to the original document table, a reading unit for reading an image of the original document disposed on the original document table, a plurality of distance sensors each for measuring distance as for a certain position of the original document table which corresponds to size of the original document disposed on the original document table, then outputting measuring value, a threshold value setting unit for setting threshold value according to the measuring value from each distance sensor, an original document size deciding unit for comparing the measuring value from each distance sensor with the threshold value set by the threshold value setting means, and deciding the size of the original document disposed on the original document table according to data representing the compared result, a reading controlling unit for controlling the reading of the reading unit according to the decided result from the original document size deciding unit, and a threshold value setting forbidding unit for forbidding the threshold value setting of the threshold value setting unit when the original cover open and close detecting unit detects that the original cover is opened.

An original document reading device may comprise a transparent original document table which has an area onto which an original document is disposed, a reading unit for reading an image of the original document disposed on the original document table, a plurality of distance sensors each for measuring distance as for a certain position of the original document table which corresponds to size of the original document disposed on the original document table, then outputting measuring value, a threshold value setting unit for setting threshold value according to the measuring value from each distance sensor, an original document size deciding unit for comparing the measuring value from each distance sensor with the threshold value set by the threshold value setting unit, and deciding the size of the original document disposed on the original document table according to data representing the compared result, a reading controlling unit for controlling the reading of the reading unit according to the decided result from the original document size deciding means, and a reading forbidding unit for forbidding the reading of the reading unit while the threshold value setting unit is changing the setting of threshold value.

An original document reading device may comprise a transparent original document table which has an area onto which an original document is disposed, a reading unit for reading an image of the original document disposed on the original document table, a plurality of distance sensors each for measuring distance as for a certain position of the original document table which corresponds to size of the original document disposed on the original document table, then outputting measuring value, a threshold value setting unit for setting threshold value according to the measuring value from each distance sensor, an original document size deciding unit for comparing the measuring value from each distance sensor with the threshold value set by the threshold value setting unit, and deciding the size of the original document disposed on the original document table according to data representing the compared result, a reading controlling unit for controlling the reading of the reading unit according to the decided result from the original document size deciding unit, and a threshold value setting forbidding unit for forbidding the threshold value setting during the reading operation of the reading unit.

An original document reading device may comprise a transparent original document table which has an area onto which an original document is disposed, an original cover which is disposed to enable itself to open and close to the original document table, an original cover opening amount detecting unit for detecting opening amount of the original cover, a reading unit for reading an image of the original document disposed on the original document table, a plurality of distance sensors each for measuring distance as for a certain position of the original document table which corresponds to size of the original document disposed on the original document table, then outputting measuring value, an original document size deciding unit for comparing the measuring value from each distance sensor with the threshold value set by the threshold value setting unit, and deciding the size of the original document disposed on the original document table according to data representing the compared result, a reading controlling unit for taking in the size of the original document decided by the original document size deciding unit and controlling the reading of the reading unit according to the size when the original cover opening amount detecting unit detects that the original cover is opened by more than a predetermined amount, and a distance measuring halt unit for halting the distance measuring of the distance sensors when the original cover opening amount detecting unit detects that the original cover is closed by more than predetermined amount.

An original document processing device may comprise a transparent original document table which has an area onto which an original document is disposed, a plurality of distance sensors each for measuring distance as for a certain position of the original document table which corresponds to size of the original document disposed on the original document table, then outputting measuring value, a threshold value setting unit for setting threshold value according to the measuring value from each distance sensor, an original document presence judging unit for judging if an original document is disposed on each certain position of the original document table by comparing each measuring value from the plurality of distance sensors with the threshold value set by the threshold value setting unit, and an original document size deciding unit for deciding the size of the original document disposed on the original document table according to the judged result from the original document presence judging unit.

Each distance sensor may be disposed to measure distance in direction which is diagonal to the original document table.

The second object may be fulfilled by an original document reading device comprising a transparent original document table which has an area onto which an original document is disposed, a reading unit for reading an image of the original document disposed on the original document table, a plurality of sensors each for measuring optically as for a certain position of the original document table which corresponds to size of the original document disposed on the original document table, then outputting measuring value, a threshold value setting unit for setting threshold value according to the measuring value from each sensor, an original document size deciding unit which comprises a memory for storing the threshold value set by the threshold value setting unit and a first IPU for implementing a program for original document size detection, for judging if an original document is disposed on each certain position of the original document table by comparing each measuring value from the plurality of sensors with the threshold value, and deciding size of the original document on the original document table according to the judged result, and outputting data representing the decided size of the original document, and a reading controlling unit which comprises a second CPU for implementing a program for original document reading control, for taking in the data representing the decided size of the original document from the original document size deciding unit to control the reading unit.

The original document reading device may further comprise a memory for storing a table for corresponding information indicating if the original document is disposed on each of the plurality of certain positions of the original document table to the size of the original document, wherein the original document size judging unit decides the size of the original document disposed on the original document table by applying the compared data as for each sensor to the table.

Each memory may have the plurality of tables; a specific table may be selected from the plurality of tables according to user's direction with a table selecting unit; and the original document size judging unit may decide the size of the original document disposed on the original document table by applying the compared data as for each sensor to the table selected by the table selecting unit.

In this construction, an original document is detected at plural positions of the original document table. An original document size detecting circuit detects original document size according to output signal from each distance sensor, and transfers original document size data indicative of the detected original document size to a main unit control circuit. The main unit control circuit takes in the original document size data transferred from the original document size detecting circuit to recognize the original document size, and controls the main unit.

Thus, the size detecting circuit is constructed separately from the main unit control circuit to detect original document size according to output from each distance sensor; therefore, change of original document sizes to be detected and increase of sensors for original document size detection can be handled easily without influencing the program of the second CPU for original document reading control.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 12 shows relation between original document size and original document size code;

FIG. 14 shows relation between defect sensor NO. and error position code;

FIG. 25 shows a display on a liquid crystal display LCD in initial mode;

DESCRIPTION OF PREFERRED EMBODIMENTS

Embodiments of the present invention are described.

EMBODIMENT 1

[entire configuration of original document reading unit of a copy machine main unit]

Figure 1:
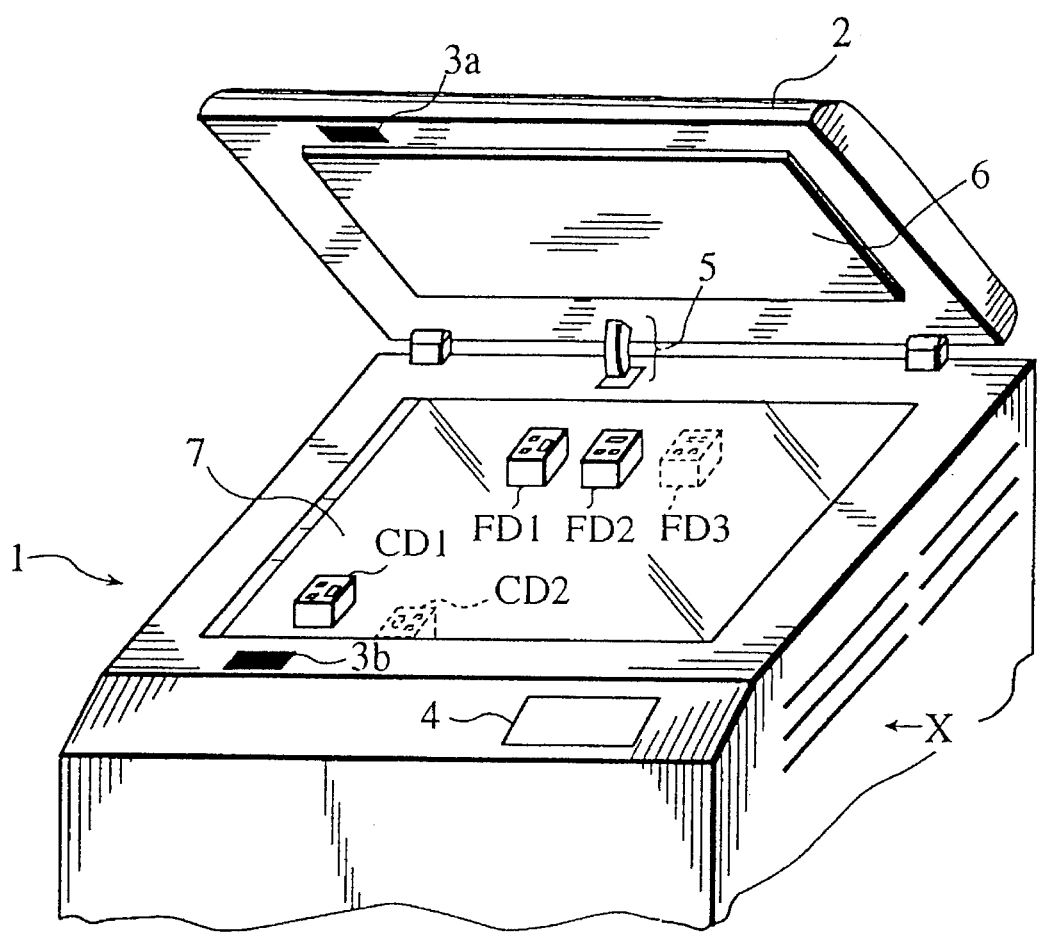
FIG. 1 is a perspective view of an original document reading unit mounted on the upper part of a copy machine main unit relating to a first embodiment.
Figure 2:
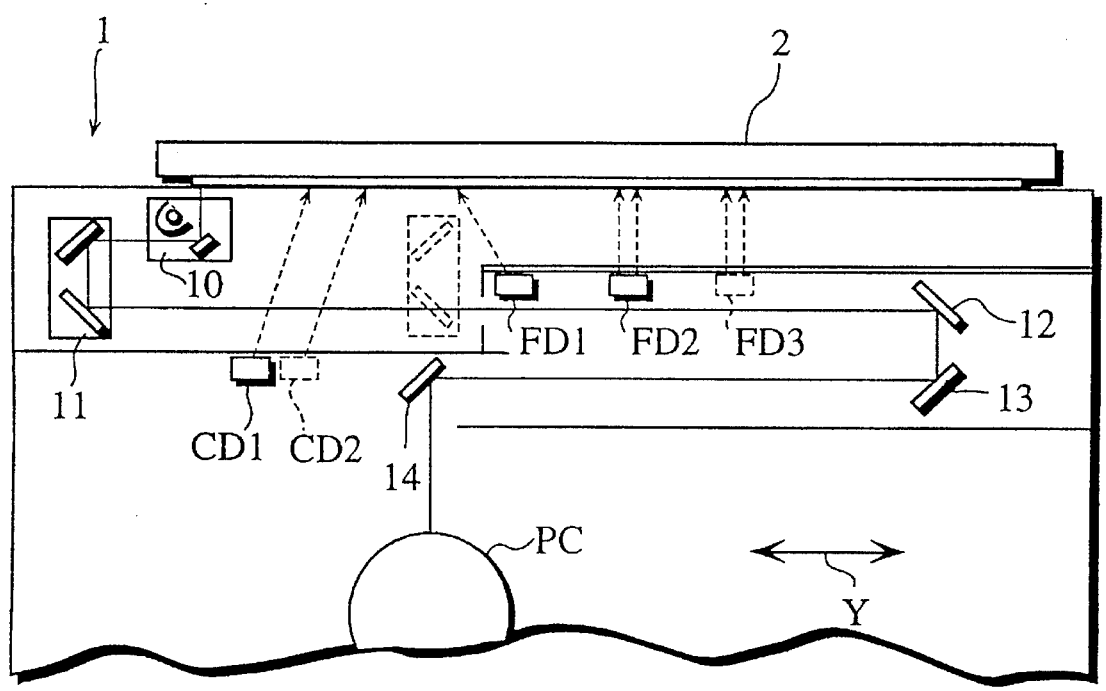
FIG. 2 is a cross sectional view of the original document reading unit viewed from the direction of arrow X.

FIG. 1 is a perspective view of an original document reading unit mounted the upper part of a copy machine main unit in a first embodiment. FIG. 2 is a cross sectional view of the original document reading unit in FIG. 1 viewed from the direction of arrow X.

As shown in FIG. 2, the original document reading unit is constructed in the upper part of a copy machine main unit 1 and an image forming unit consisting of a photosensitive drum PC and the like, and a paper feed tray (not illustrated) are constructed in its lower part.

The original document reading unit has a scanning glass 7 on the upper surface of the copy machine main unit 1 onto which an original document is disposed, an original cover 2 for covering an original document on the scanning glass 7, a control panel 4 which is constructed at the front edge of the upper surface of the copy machine main unit 1, an optical system for illuminating an original document on the scanning glass 7 and forming an image on the surface of the photosensitive drum PC from the light rays reflected by the original document, and distance sensor units FD1, FD2, FD3, CD1, CD2 for detecting original document sizes.

Although not illustrated, well-known components of the image forming unit, such as a developer, a transcription charger, a cleaner, an eraser, and an anti-static charger are constructed around the photosensitive drum PC, and an electrostatic latent image formed by the optical system on the photosensitive drum PC is converted into a visible toner powder image by the developer. The toner powder image is, then, transcribed on a copy sheet from the paper feed tray, and is affixed to the copy sheet. Then, it is discharged to outside of the copy machine main unit 1. Although not illustrated, a controller for controlling the entire operation of the copy machine main unit 1, such as original document reading and original document size detection, is included in the copy machine main unit 1.

The optical system constructed beneath the scanning glass 7 comprises a first slider 10 for holding an exposure lamp and a reflection mirror, a second slider 11 for holding a reflection mirror, and reflection mirrors 12, 13, 14. The first slider 10 can move in the horizontal direction (in the direction shown by left and right pointing arrow Y in FIG. 2) along the bottom end of the scanning glass 7. The second slider 11 is coupled to the first slider 10 to move within the half of the migration range of the first slider 10 (the left half of FIG. 2).

In the thus constructed optical system, the exposure lamp of the first slider 10 illuminates an original document, and the light rays reflected by the original document is transmitted through the reflection mirrors 12, 13, 14 to form an electrostatic latent image on the surface of the photosensitive drum PC constructed in the lower part of the reflection mirror 14.

The original cover 2 covers the whole surface of the scanning glass 7. It is mounted on the upper surface of the copy machine main unit 1 to enable the user to open and close the original cover 2 with one end of the original cover 2 being axis. In this manner, the scanning glass 7 is opened and closed when the user opens and closes the original cover 2. A white color original presser 6 is mounted on the lower surface of the original cover 2. When the original cover 2 is closed, the original presser 6 presses an original document to the scanning glass 7. Also, a magnet 3a is mounted on the lower surface of the original cover 2, and a lead switch 3a is mounted on the upper surface of the copy machine main unit 1 to correspond to the magnet 3a in the original cover 2. When the original cover 2 is closed, the magnet 3a is in contact with the lead switch 3b, and original cover close signal indicative of the close of the original cover 2 is transmitted to the controller.

An opening angle detecting unit 5 is provided between the rear part of the original cover 2 and the copy machine main unit 1 for detecting if the opening angle of the original cover 2 relative to upper surface of the copy machine main unit 1 is smaller than standard angle. When the opening angle is smaller than standard angle, the opening angle detecting unit 5 transmits an original cover standard angle signal. The opening angle detecting unit 5 may have various configurations. For example, it may comprise an actuator in original cover and a single photo interrupter in the copy machine main unit 1.

(description of distance sensor unit)

As shown in FIG. 2, the distance sensor units FD1, FD2, FD3, CD1, CD2 are constructed at predetermined positions beneath the scanning glass 7. The distance sensor units FD1, FD2, FD3 at predetermined positions detect original document size in the direction that the first slider 10 moves; and the distance sensor units CD1 and CD2 at predetermined positions detect original document size in the horizontal direction being perpendicular to the direction in which the first slider 10 moves. The distance sensor units FD3 and CD2 are optional. The distance sensor units FD1–FD3 are mounted beneath a moving path for the first slider 10; and the distance sensor units CD1–CD2 are mounted beneath a moving path for the second slider 11.

Figure 3A:
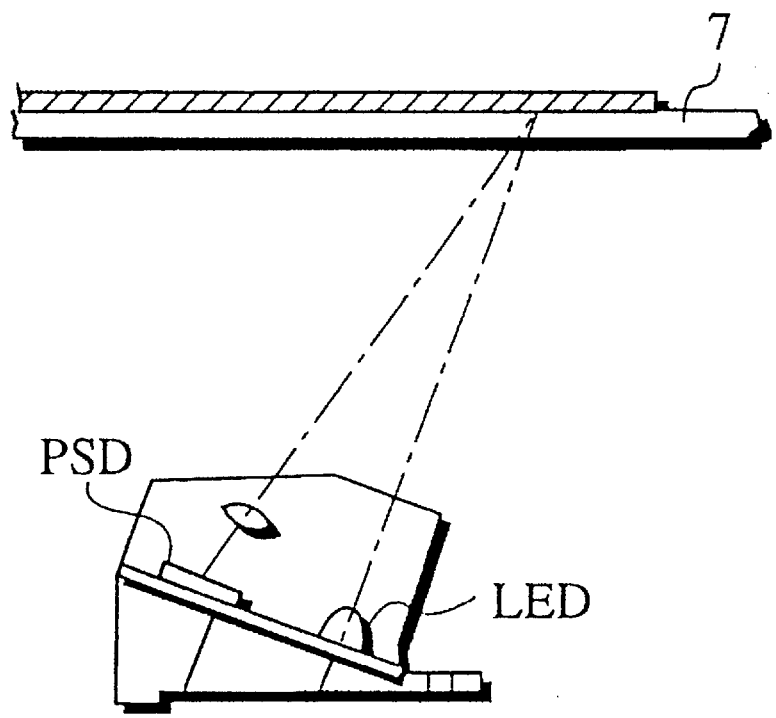
FIG. 3 shows the configuration of a distance sensor unit, and light emitting and sensing operations.
Figure 3B:
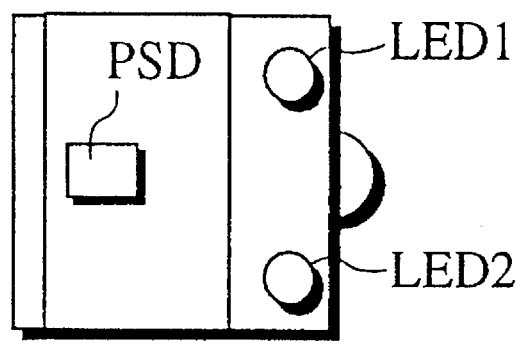

FIGS. 3(a) and (b) show the configuration of each distance sensor unit in FIG. 1, and how the light rays are emitted and sensed by it. FIGS. 3(a) and (b) show the distance sensor unit viewed from side and top respectively. Each distance sensor unit comprises a couple of light emitting devices (LEDs 1, 2) and a single photo sensing device (PSD). With the thus constructed distance sensor unit, reflection of the light rays from the LED1 and reflection of the light rays from the LED2 are sensed by the single PSD, and the distance to each position can be detected.

Figure 4:
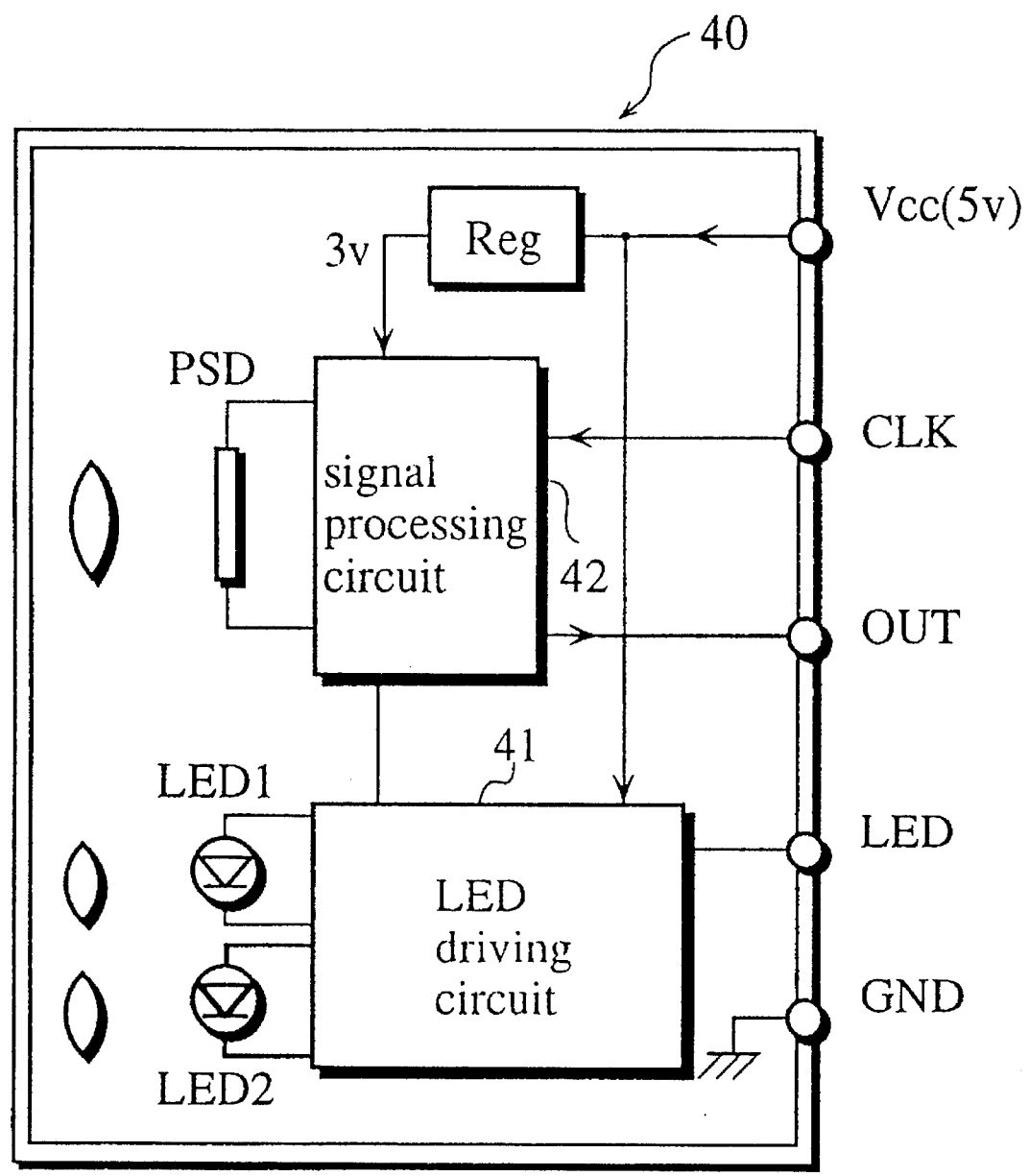
FIG. 4 shows the configuration of a sensor control circuit embedded in the distance sensor unit.

FIG. 4 shows the configuration of a sensor control circuit included in each distance sensor unit in FIG. 1. As shown in FIG. 4, a sensor control circuit 40 comprises an LED driving circuit 41 for driving the LED 1 and LED 2, and a signal processing circuit 42 for converting analog detection signal from the PSD into digital signal. According to state of LED signal inputted from controller of the copy machine main unit 1 into the LED driving circuit 41, the sensor control circuit 40 controls either the LED1 or the LED2 to illuminate. The light rays reflected by an object to be detected are inputted to the PSD, and are sensed by the PSD. According to position of the PSD where the reflected light rays are sensed, the distance to the object is detected.

The PSD outputs analog detection signal which corresponds to the detected position. This analog detection signal is converted into digital signal by the signal processing circuit 42, and is outputted as sensor output signal (sensor data) being in synchronous with clock signal CLK.

In the thus constructed distance sensor units FD1–3, CD1–2, the LED 1 and LED 2 of each distance sensor unit illuminate predetermined positions of an original document disposed on the scanning glass 7; the light rays reflected by the original document are sensed by the PSD; and sensor data corresponding to position of the PSD at which the light rays are sensed is outputted. Although we will see below the detailed description, the controller compares output value of this sensor data with a preset threshold value to judge if an original document is disposed on a certain position of the scanning glass 7.

FIG. 5 shows disposition of distance sensor units. To make the PSD sense the light rays reflected by an original document randomly, the LEDs 1 and 2 of each distance sensor unit illuminate an original document diagonally.

Figure 5A:
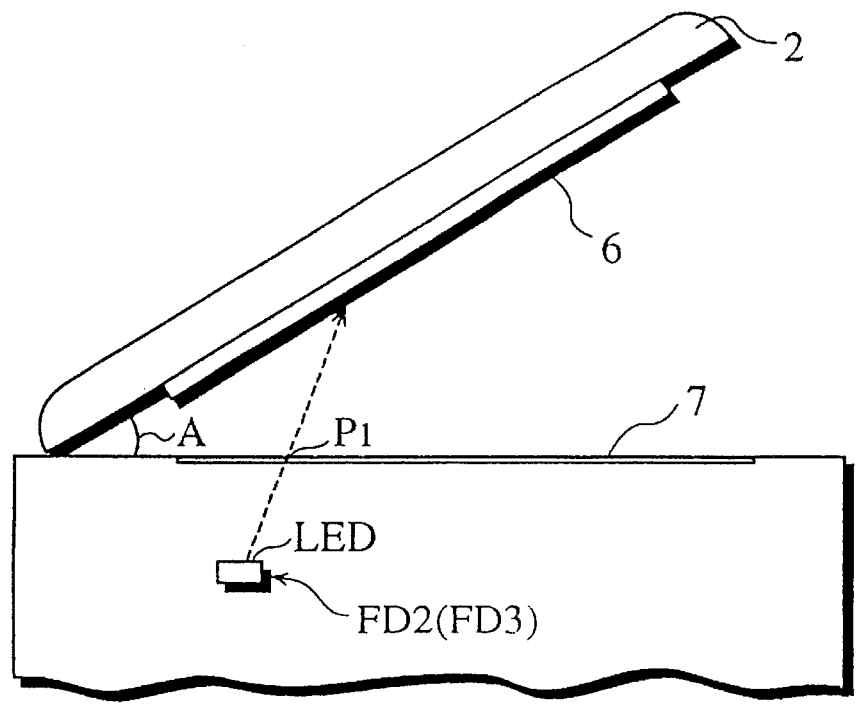
FIG. 5 shows disposition of distance sensor units.

Also, each distance sensor unit emits the light rays diagonally so that the distance of the light rays to the original cover 2 is extended. For example, as shown in FIG. 5(a), to extend the distance of the light rays from the distance sensor units FD2 and FD3 to the original cover 2 the distance sensor units FD2 and FD3 illuminate forward instead of illuminating right overhead [the opposite direction to the opening axis of the original cover 2, and the right direction in FIG. 5(a)]. Accordingly, when the original cover 2 is opened by standard angle [A in FIG. 5(a)] and the presence or absence of an original document at a certain position P1 of the scanning glass 7 is judged, the difference between the distance from the distance sensor units FD2, FD3 to the scanning glass 7 and the distance from the distance sensor units FD2, FD3 to the original cover 2 becomes greater. The greater such difference is, the smaller threshold value can be set to detect the presence or absence of an original document according to sensor data from the PSD. Although described in great detail later, a small threshold value will permit floating of an original document above the scanning glass 7 and lowering in output because of the life-time of sensors to greater extent.

Figure 5B:
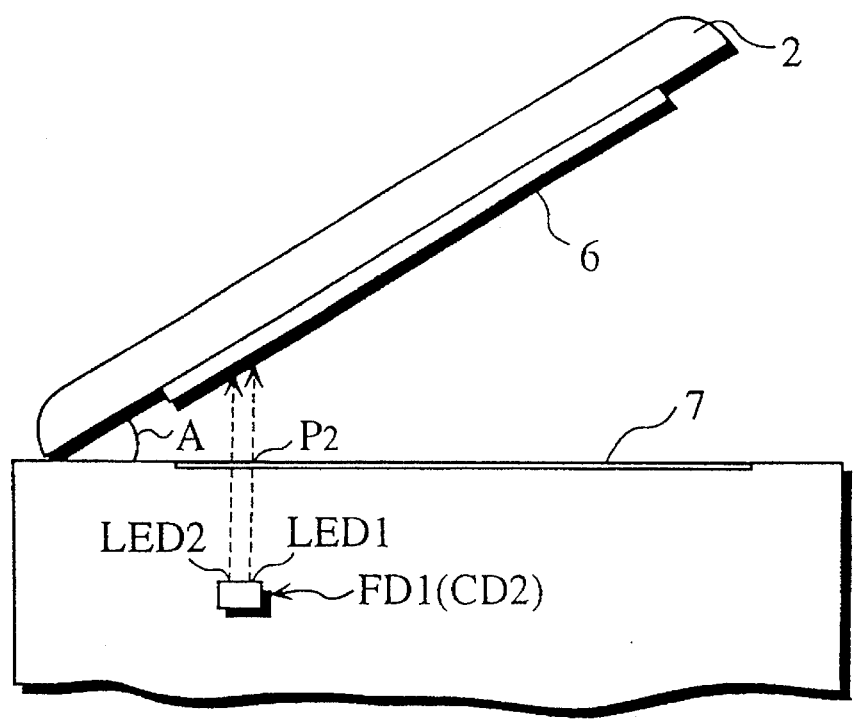

The LED of each distance sensor unit illuminates certain position of the scanning glass 7 which is determined according to original document size [P1 in FIG. 5(a) and P2 in FIG. 5(b)]. With the distance sensor units FD1 and CD2, only the longer light ray to the original cover 2 [the light ray from the LED 1 in FIG. 5(b)] is employed, and the other light ray is ignored.

Figures 6A, 6B:
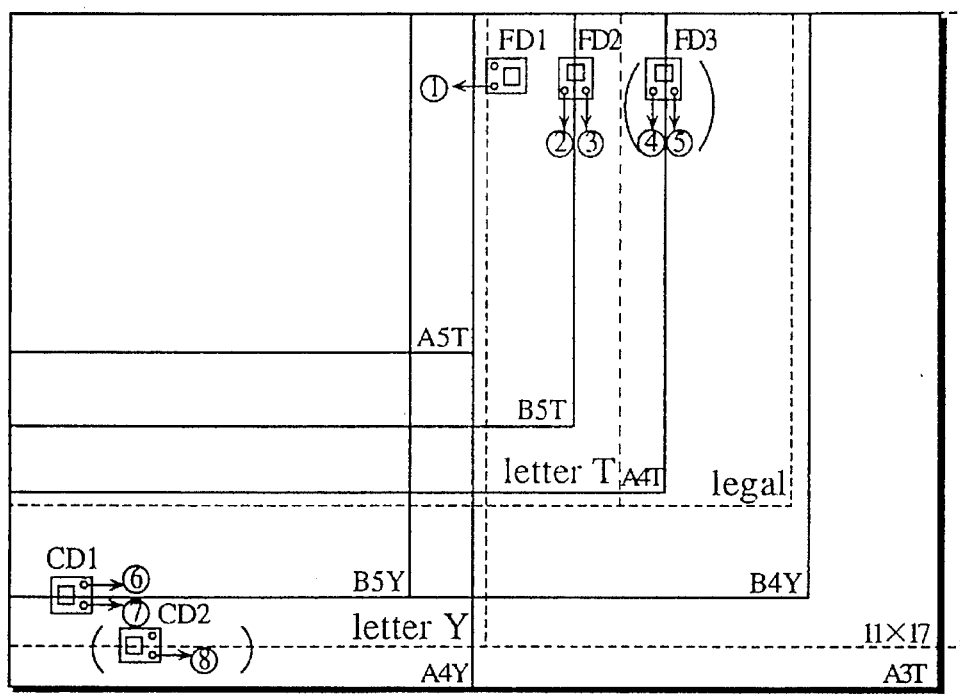
FIG. 6 shows relation between disposition of distance sensor units destined for Japanese market and original document size.

Disposition of each distance sensor unit and a method of detecting original document size with controller of the copy machine main unit 1 are described. FIGS. 6(a), 7(a), and 8(a) show relation between disposition of distance sensor units and original document sizes. FIGS. 6(b), 7(b), and 8(b) are tables where the presence or absence of an original document which is detected from sensor data for each LED of distance sensor unit is related to original document size. This table is held by the controller. FIG. 6 shows device destined for Japanese market, and FIGS. 7 and 8 show device destined for European market.

Figures 7A, 7B:
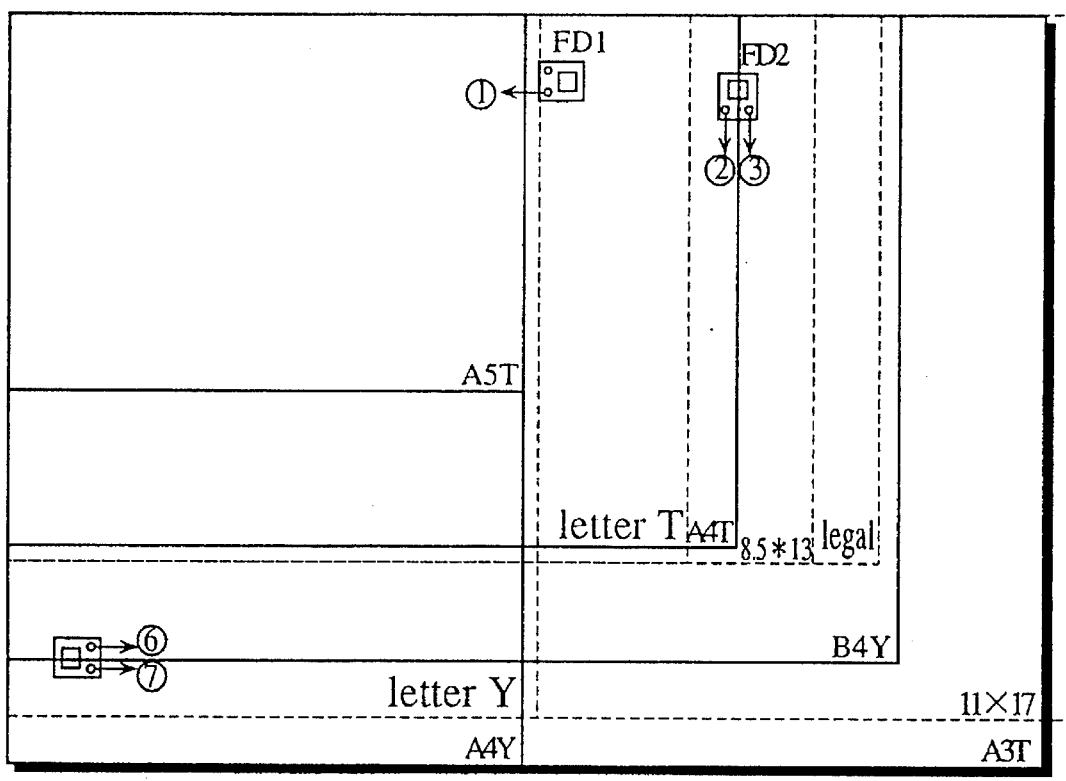
FIG. 7 shows relation between disposition of distance sensor units destined for European market and original document size.
Figures 8A, 8B:
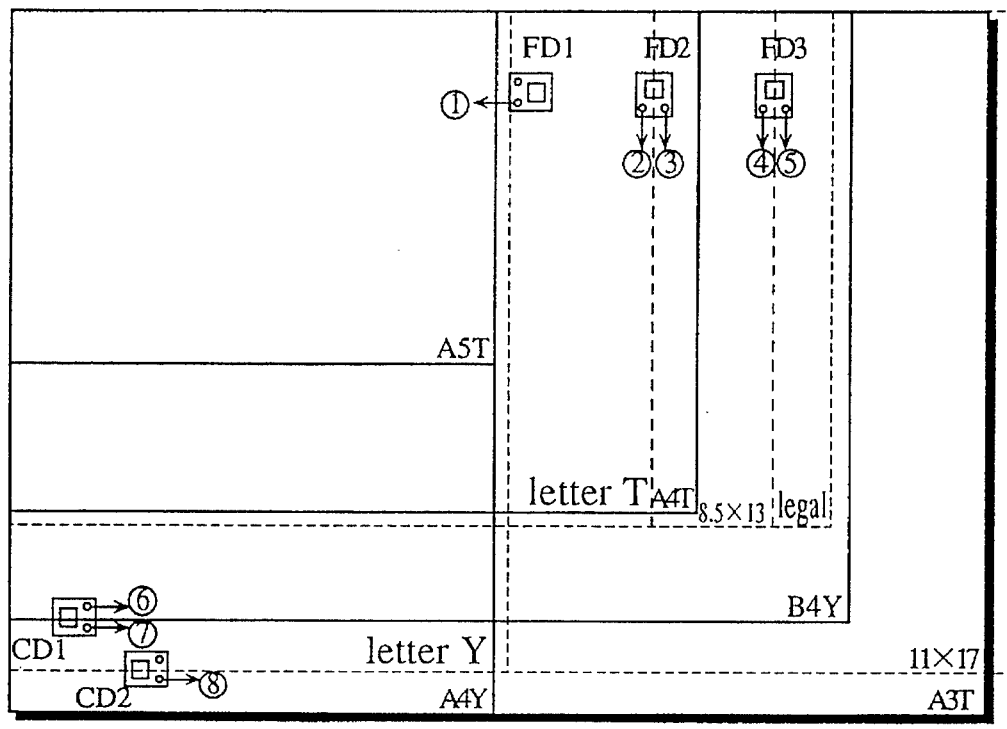
FIG. 8 shows relation between another disposition of distance sensor unit destined for European market and original document size.

As shown in FIG. 6(a), 7(a), and 8(a), the distance sensor units FD 1–3, CD 1, 2 are positioned corresponding to original document sizes. By illuminating positions (1)–(8) which correspond to original document sizes with the LEDs 1, 2 of each distance sensor unit, the presence or absence of an original document at positions (1)–(8) is detected. Each "o" in FIG. 6(b), 7(b), and 8(b) represents the presence of an original document at the positions (1)–(8) in FIGS. 6(a), 7(a), and 8(a), while "x" represents the absence of an original document at the positions (1)–(8).

The controller detects original document size as referring to the presence or absence of an original document at the positions (1)–(8) which is detected according to sensor data from the distance sensor units FDs1–3, CDs1, 2 and tables.

As for device destined for Japanese market, original document size is basically measured by centimeter. Further, it is often demanded by foreign capital companies to detect document size by inch as well; therefore, the optional distance sensor units FD3 and CD2 are included to detect original document size by inch besides the basic sensor units FDs1, 2 and CD1 for detecting original document size by centimeter.

The capability of distinguishing A4 size from 8.5*13 size may be enough for most of devices destined for European market. This is achieved by disposition of sensor units shown in FIG. 7(a). In some regions, the capability of distinguishing letter, A4, 8.5*13, legal (8.5*14) is desired, and this is achieved by disposition of sensor units in FIG. 8(a). FIG. 8(a) is different from FIG. 7(a) in that the distance sensor units FD3 and CD2 are included, and the distance sensor unit FD2 is positioned differently.

A distance sensor unit cannot be disposed right beneath an area of the scanning glass 7 on which an A5T size original document is disposed since the second slider 11 migrates through this area. Therefore, the distance sensor unit FD1 for detecting an A5T size original document is positioned downstream of the direction in which the second slider 11 moves (right hand in FIGS. 6–8), and it leans toward upstream (left hand in FIGS. 6–8) (See FIG. 2).

So far has been described about distance sensor units. These distance sensor units are hardly influenced by the light intensity, so that high detection accuracy for original document size is insured for a long time. For example, demanded accuracy is insured for the life-time of 5 years, that is 24 hours*365 days*5 years=43,800 hours (about 50,000 hours), with the tolerance of more than 0.80 for the original document density O.D [-log10 (reflection rate of original document)], and more than 5 mm for the floating of an original document above the scanning glass 7.

Compared to conventional sensors for detecting in accordance with the light intensity by which demanded accuracy is insured for the life-time of 12,000 hours with the tolerance of 0.25 for the original document density O.D and 3 mm for the floating of an original document above the scanning glass 7, the distance sensor units in the present invention are much more effective. Further, conventional circuit for turning ON/OFF sensors in synchronous with main switch is omitted in the present invention.

(description of control panel and controller)

Figure 9:
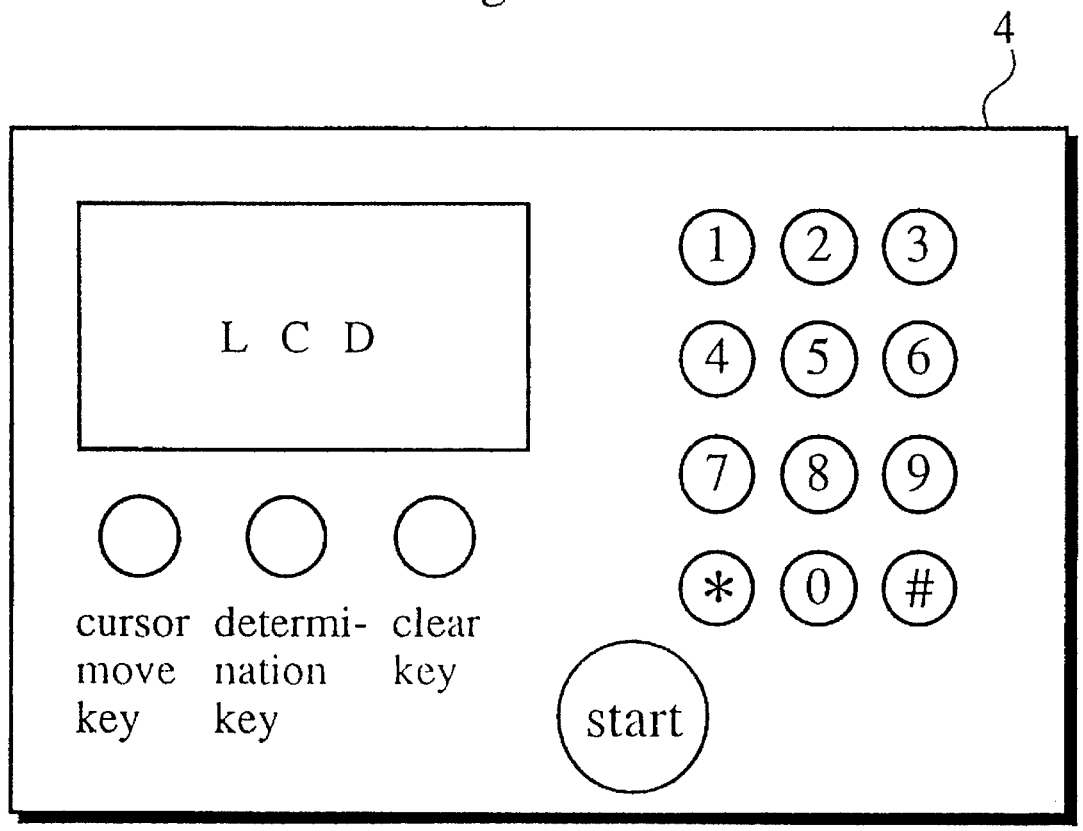
FIG. 9 shows a control panel for a copy machine main unit.

FIG. 9 shows the control panel 4 for the copy machine main unit in FIG. 1. As shown in FIG. 9, the control panel 4 includes ten keys with which the user inputs numbers to the copy machine main unit 1, a start key for directing copy processing, a clear key for erasing what has been inputted, a cursor move key, a liquid crystal display unit LCD for various displays and the like.

To re-set a threshold value (initial processing) in this embodiment, the user presses both the "#" key and the start key of the control panel 4 simultaneously, so that initial mode is set. When FIG. 25 (1) is displayed on the liquid crystal display unit LCD, the user can move "←" between the right hand of "no option" and the right hand of "option" with the cursor move key. Consequently, whether or not the optional distance sensor units FD3, CD2 are used is selected.

Figure 10:
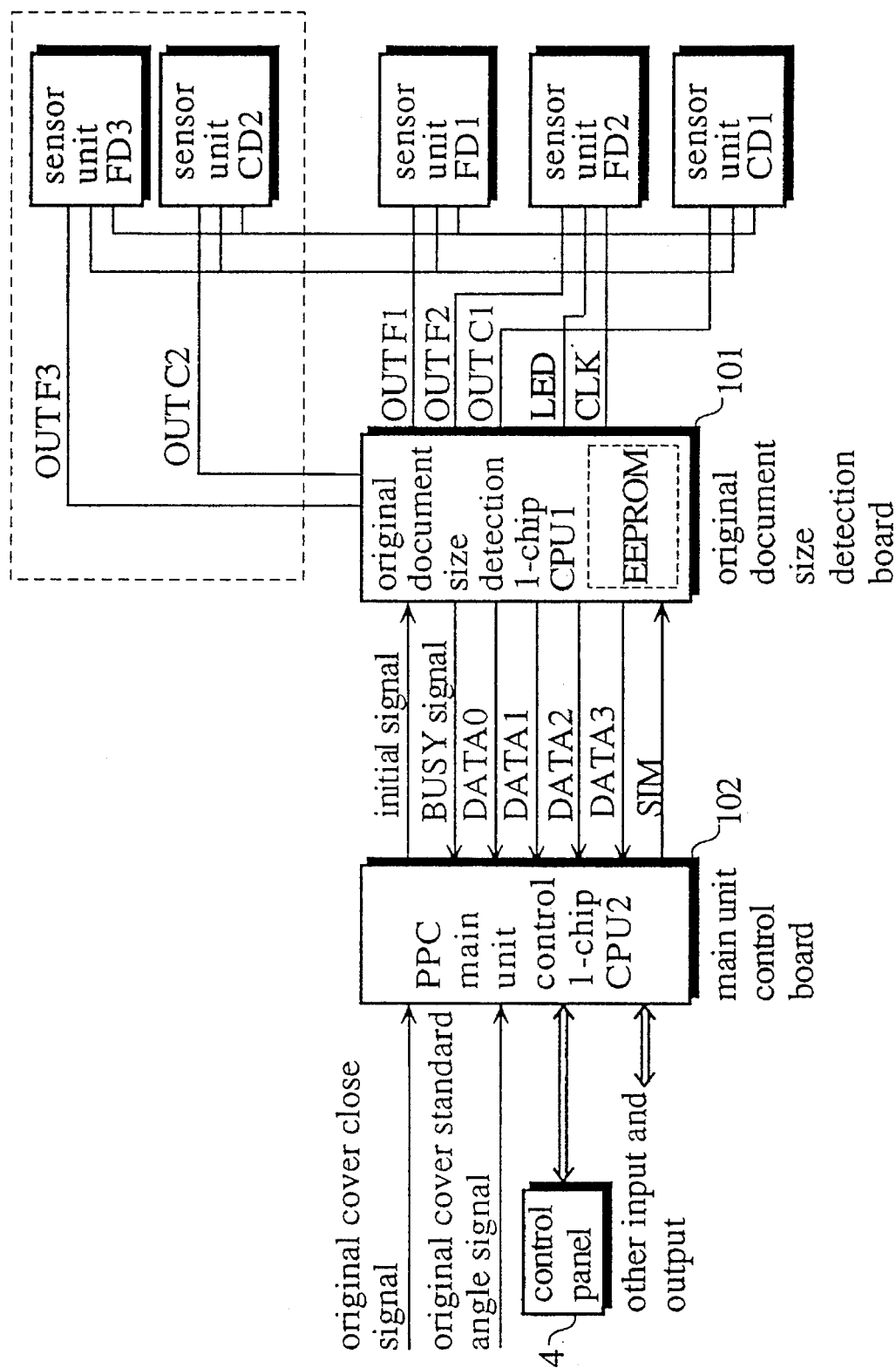
FIG. 10 is a block diagram depicting a controller of the copy machine main unit.

FIG. 10 is a block diagram depicting the controller of the copy machine main unit 1 in FIG. 1. As shown in FIG. 1, the controller comprises an original document size detection board 101 including one-chip CPU 1 for document size detection and an EEPROM, and a main unit control board 102 including one-chip CPU 2 for main unit control.

The CPU 1 outputs LED signal set forth above and clock signal CLK to each of the distance sensor units FDs 1–3, and CDs 1, 2. The LED 1, 2 of each distance sensor unit illuminate in synchronous with this LED signal, and outputs sensor data OUTF1, OUTF2, OUTF3, OUTC1, OUTC2 to the CPU 1 in synchronous with this clock signal CLK. A threshold value with which the CPU 1 detects the presence and absence of an original document, and the table with which the CPU 1 detects original document size are stored in the EEPROM. Both threshold value and table are described previously.

Figure 11:
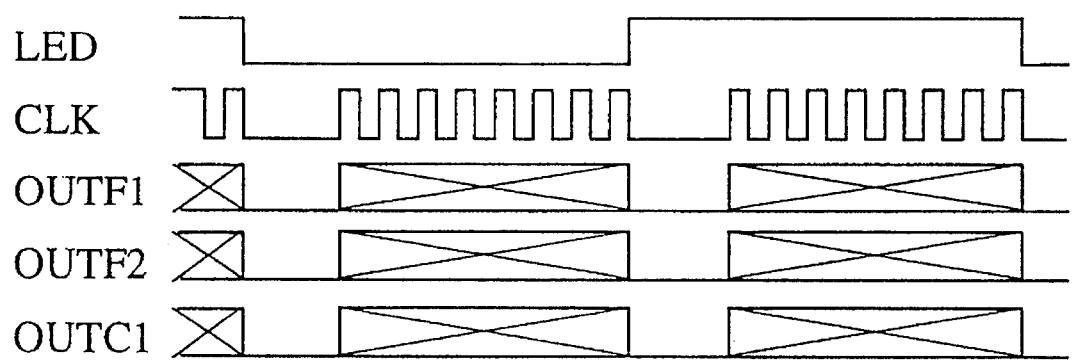
FIG. 11 is a time chart showing clock signal CLK generated from an original document size detection CPU 1 and reception timings of LED signal and output signal from each sensor.

FIG. 11 is a time chart showing the timings at which clock signal CLK and LED signal from the CPU 1 in FIG. 10 and sensor data from each distance sensor unit are received. As shown in FIG. 11, ON/OFF of LED signal is switched in a cycle which is several times longer than that for clock signal CLK. According to LED signal, the LEDs 1, 2 of each distance sensor unit illuminate alternatively. Therefore, being coupled with the switching of the LED signal between ON/OFF, signal relating to a position illuminated by the LED 1, and signal relating to a position illuminated by the LED 2 are provided to sensor data OUTF1–3, OUTC 1–2 alternatively (to be noted, the distance sensor units FD1 and CD2 use only one of the LEDs, so that signal from the single LED is provided to the sensor data OUTF1 and OUTC 2).

FIG. 12 shows correspondence between original document size code outputted from the CPU 1 in FIG. 10 and original document size (including no paper, and sensor error code).

According to detected original document size, the CPU 1 generates 4 bit original document size code (DATA0–3 in FIG. 10), and transmits it to the main unit control CPU 2. As shown in FIG. 10, original document size can be judged according to original document size code DATA 0–3. At the timing that the CPU 2 detects that the original cover 2 is opened by standard angle in accordance with original cover standard angle signal from the opening angle detecting unit 5 (see FIG. 1), the CPU 2 latches original document size code DATA0–3, and judges original document size.

Figure 13A:
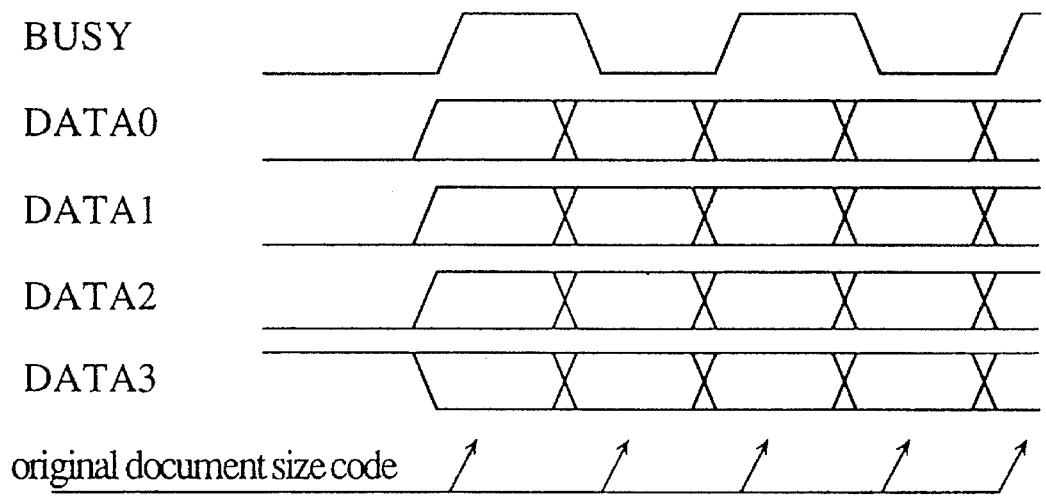
FIG. 13 is a time chart showing transfer timing of original document size code.
Figure 13B:
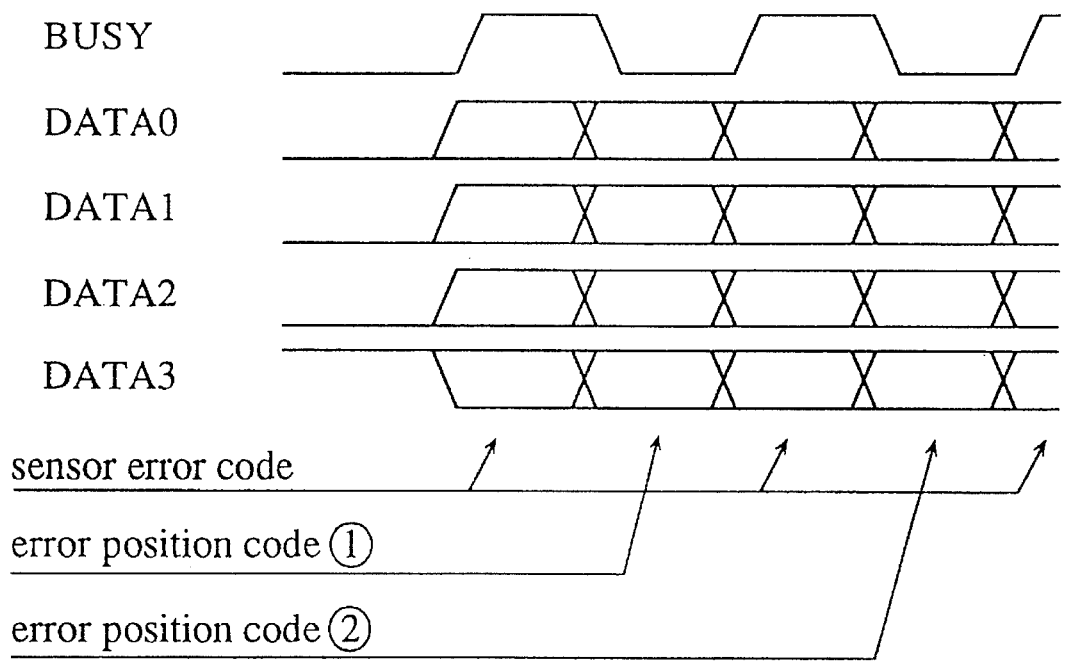

FIG. 13 is a time chart showing the timings at which original document size code DATA0–3 is transferred. As shown in FIG. 13(a), original document size code DATA 0–3 is transferred from the CPU 1 to the CPU 2 in synchronous with BUSY signal pulse. As shown in FIG. 13(b), when abnormality is detected with a distance sensor unit, sensor error code indicative of abnormality (see the bottom row in FIG. 12) and error position codes (1), (2) indicative of defect distance sensor units are transferred as code DATA 0–3.

FIG. 14 shows correspondence between a defect sensor No. and error position codes (1), (2). The error position code (1) in FIG. 14(a) indicates that the distance sensor units FDs 1–3 are in unusual state. The error position code (2) in FIG. 14(b) indicates that the distance sensor units CDs 1, 2 are in unusual state. In FIG. 14, defect sensor Nos. 1–3 correspond to the distance sensor units FDs1–3; and detect sensor Nos. 4 and 5 correspond to the distance sensor units CDs1 and 2 respectively. DATA 0 in the error position codes 1, 2 indicates which error code table, FIG. 14(a) or 14(b), is referred. (Shortage of measuring time) in FIG. 14(b) is not related to this embodiment but to a fifth embodiment.

If power is turned off during initial mode, error position code which is an initial error A at the first low of FIG. 14 (a) or an initial error B at the bottom row of FIG. 14(b) is transferred after sensor error code.

Thus, by sending original document size code DATA 0–3 or sensor error code, error position code (1), (2), and initial error A, B from the CPU 1 to the CPU 2, it is possible to let the CPU 2 obtain original document size information or error information (distance sensor unit number with an error) if a distance sensor unit has an error.

As shown in FIG. 10, an "initial signal" which directs the CPU 1 to operate initial processing, and an "SIM signal" which directs the CPU 1 to set initial mode are transferred from the CPU 2 to the CPU 1.

(description of initial processing)

Figure 15:
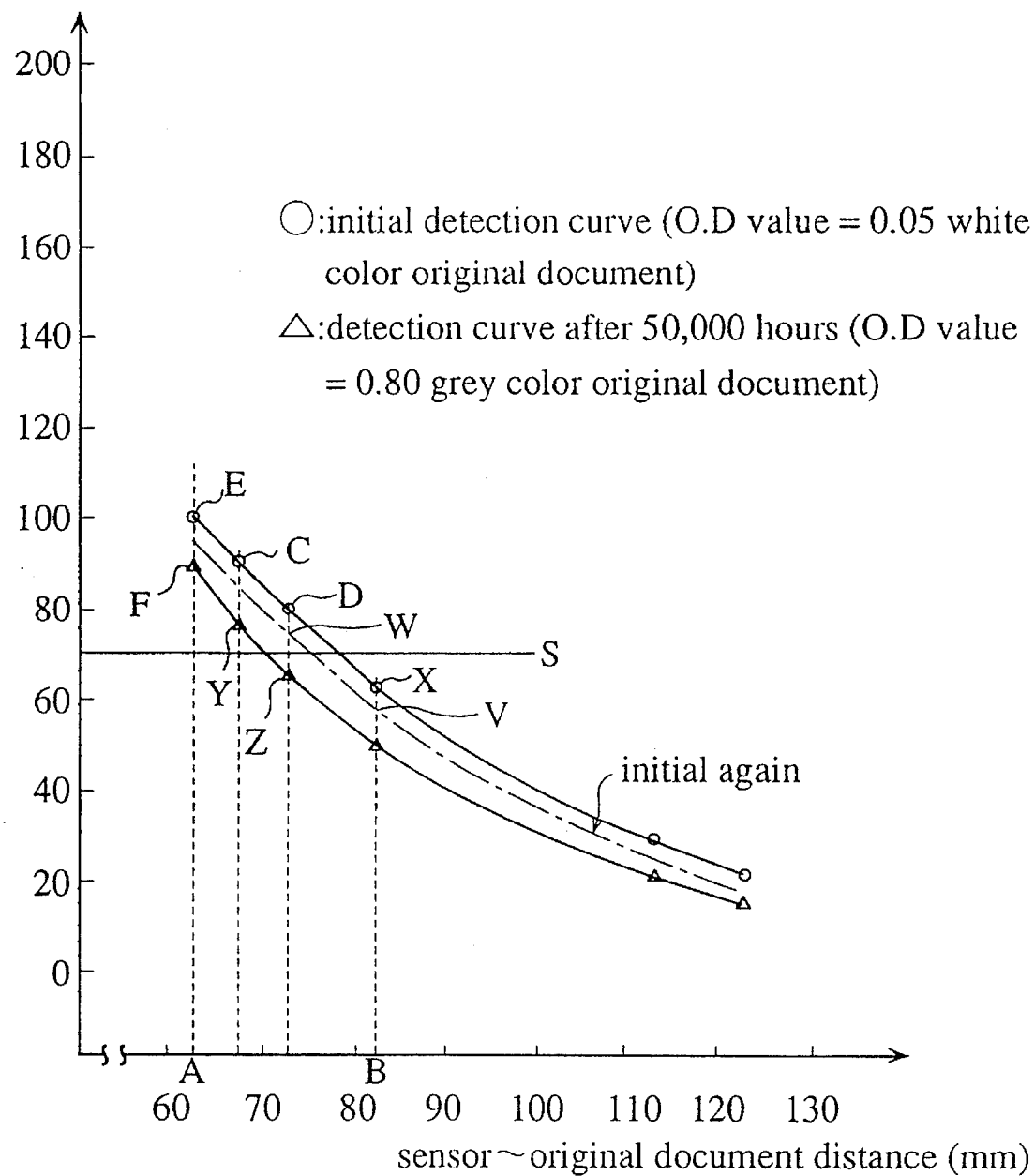
FIG. 15 shows characteristics of sensor output value from distance sensor unit at initial stage and 50,000 hours later.

Initial processing is described. FIG. 15 shows characteristics of output value outputted from distance sensor unit as sensor data at initial stage and 50,000 hours later. In FIG. 15, a distance A is the distance between a sensor unit and an original document which is disposed on the scanning glass without any space; and a distance B is the distance between a sensor unit and the original cover 2 when data is latched.

Since detection is operated with the tolerance of 0.80 for the document density O.D and 5 mm for the floating of an original document above the scanning glass 7 in 50,000 hours, FIG. 15 includes both an original document detection curve for a white color document with 0.05 for the document density 0.D at initial stage and an original document detection curve for a grey color document with 0.8 for the document density 0.D 50,000 hours later.

It is assumed that sensor output value does not change as time passes when a sensor detects a white color original document. In this case, if a threshold value S is set between output value for the distance A and output value for the distance B, output value (point E) during data latch is greater than the threshold value S if the sensor detects the presence of a white color original document, and output value (point X) is smaller than the threshold value S if the sensor detects the absence of a white color original document. Therefore, the presence/absence of an original document can be judged by comparing sensor output value from each distance sensor unit with the threshold value S.

When an original document floats above the scanning glass 7 by 5 mm, point C and Y represent sensor output values at initial stage and 50,000 hours later respectively. Therefore, with the tolerance of 5 mm for the floating of an original document above the scanning glass, and with the life-time of 50,000 hours, threshold value S should be set between sensor output value (point Y) with an original document floating by 5 mm 50,000 hours later and sensor output value (point X) with no original document at initial stage. By setting such threshold value S, the presence/absence of a grey color original document with 0.8 for the document density O.D can be detected with the tolerance of 5 mm floating and with the life-time of 50,000 hours without another initial processing.

If threshold value is set between sensor output value (point Z) with an original document floating by 10 mm 50,000 hours later and sensor output value (point X) with no original document, it is also possible to detect the presence/absence of a grey original document with 0.8 for the document density O.D which is floating by 10 mm 50,000 hours later. However, as shown in FIG. 15, the margin between these two sensor outputs (point Z and point X) is very small. Therefore, with the tolerance of 0.80 for the document density O.D of a grey original document and 10 mm for floating, an error occurs in detection of standard angle for data latch as the original cover 2 is transformed as time passes.

By repeating initial processing several times in 50,000 hours, threshold value can be determined within sufficient margin even with the tolerance of 10 mm for floating. As shown in FIG., 16 we will see below, when an original document with 0.05 for the document density O.D and an original document with 0.80 for the document density O.D are positioned the same distance from a sensor, sensor outputs are different only by 4–5 (DEC). Therefore, the difference in sensor output values as for a white original document and a grey original document can be ignored herein. The effect of repeating initial processing is described as referring to FIG. 15.

For example, with a detection curve shown by a dashed line, if it is planned to repeat initial processing, the first threshold value is set between a sensor output value (point W) and a sensor output value (point X), and the second threshold value is set between a sensor output value (point Z) and a sensor output value (point V). Compared to a single initial processing in 50,000 hours for setting threshold value between two sensor output values (point Z and X), a broader margin can be obtained. Although not illustrated, the more initial processing is repeated, the broader margin can be obtained.

The gist of initial processing is described. In initial processing, no original document is disposed on the scanning glass 7 and the original cover 2 remains closed in this embodiment because of the following reasons.

Figure 16:
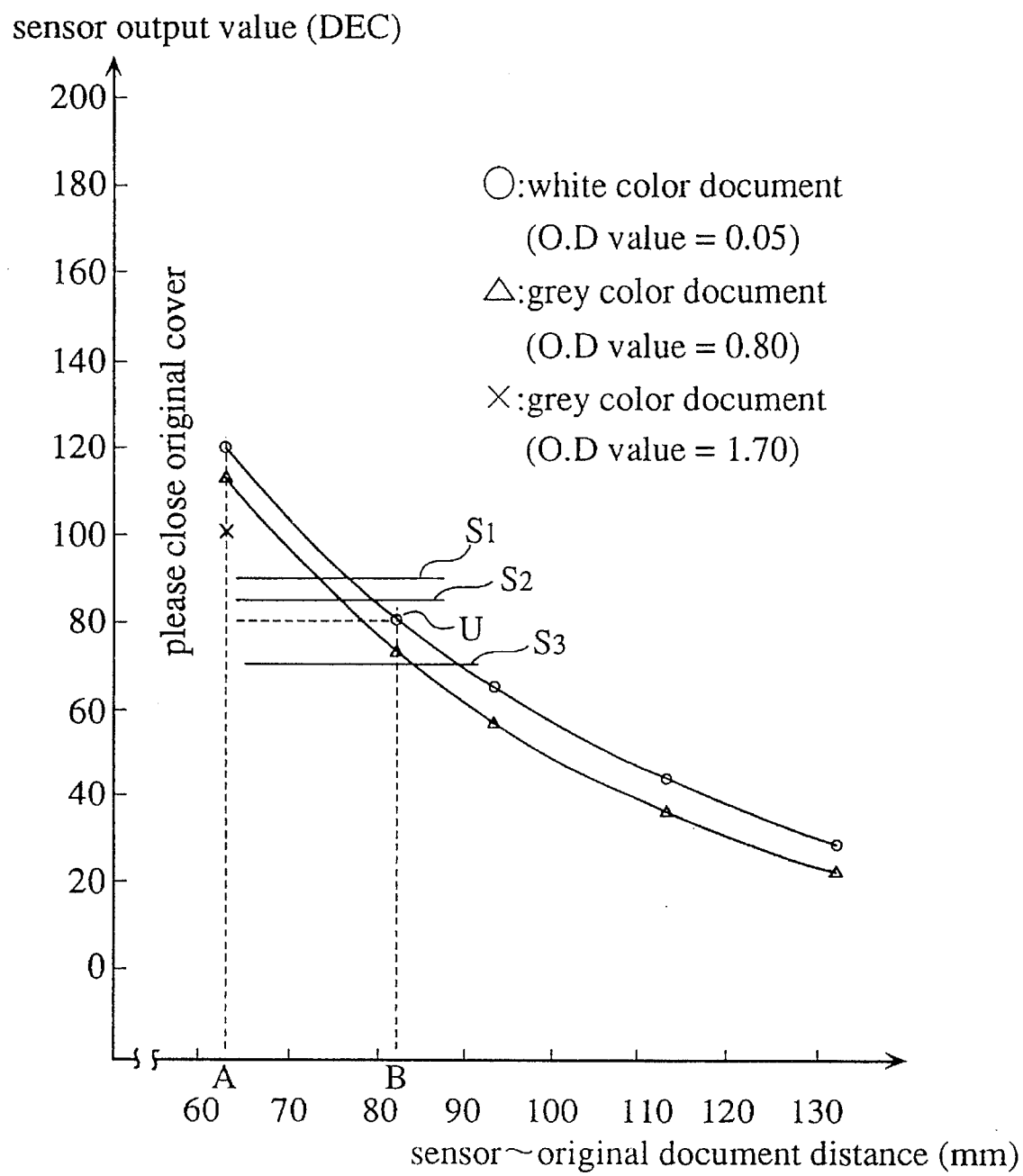
FIG. 16 shows characteristics of sensor output value as for a white original document and a grey original document.

FIG. 16 shows characteristics of sensor output value with a white original document whose document density O.D is 0.05 and a grey original document whose document density O.D is 0.80. For example, if a standard threshold value S1, which is obtained by (sensor output value when a white original document is detected at a distance A)−30, is 120−30=90 DEC, the presence/absence of an original document can be detected with sufficient margin as shown in FIG. 16.

A threshold value S2 is 115−30=85 DEC when an original document with the document density O.D being 0.80 is disposed. Thus, there is a slip between the threshold value S2 and the standard threshold value S1. With this slipped threshold value S2 (85 DEC), the margin between itself and a sensor output value U for a distance B to the original cover 2 (79 DEC) is small in data latch.

A threshold value S3 is 100−30=70 DEC when a grey original document whose document density O.D is 1.70 is disposed on the scanning glass 7. Since the sensor output value U for distance B to the original cover 2 is about 79 DEC, sensor output value exceeds the threshold values S3 (70 DEC) even when no document is disposed. In this case, the sensor would indicate as if an document were disposed. For this reason, when setting a threshold value, no colored document should be disposed on the scanning glass 7, but a threshold value S must be set with a white original document or the like on the scanning glass 7.

If a threshold value were set with no document on the scanning glass 7, it would be a slipped value. As a result, an error occurs in document size detection.

For the reasons set forth above and to be noted that the document pressing surface 6 is white, a correct threshold value is set in this embodiment with no document on the scanning glass 7 and the original cover 2 being closed (this is the same an automatic document feeder such as ADF). (operation of copy machine main unit 1)

The operation is described as referring to flow charts.

Figure 17:
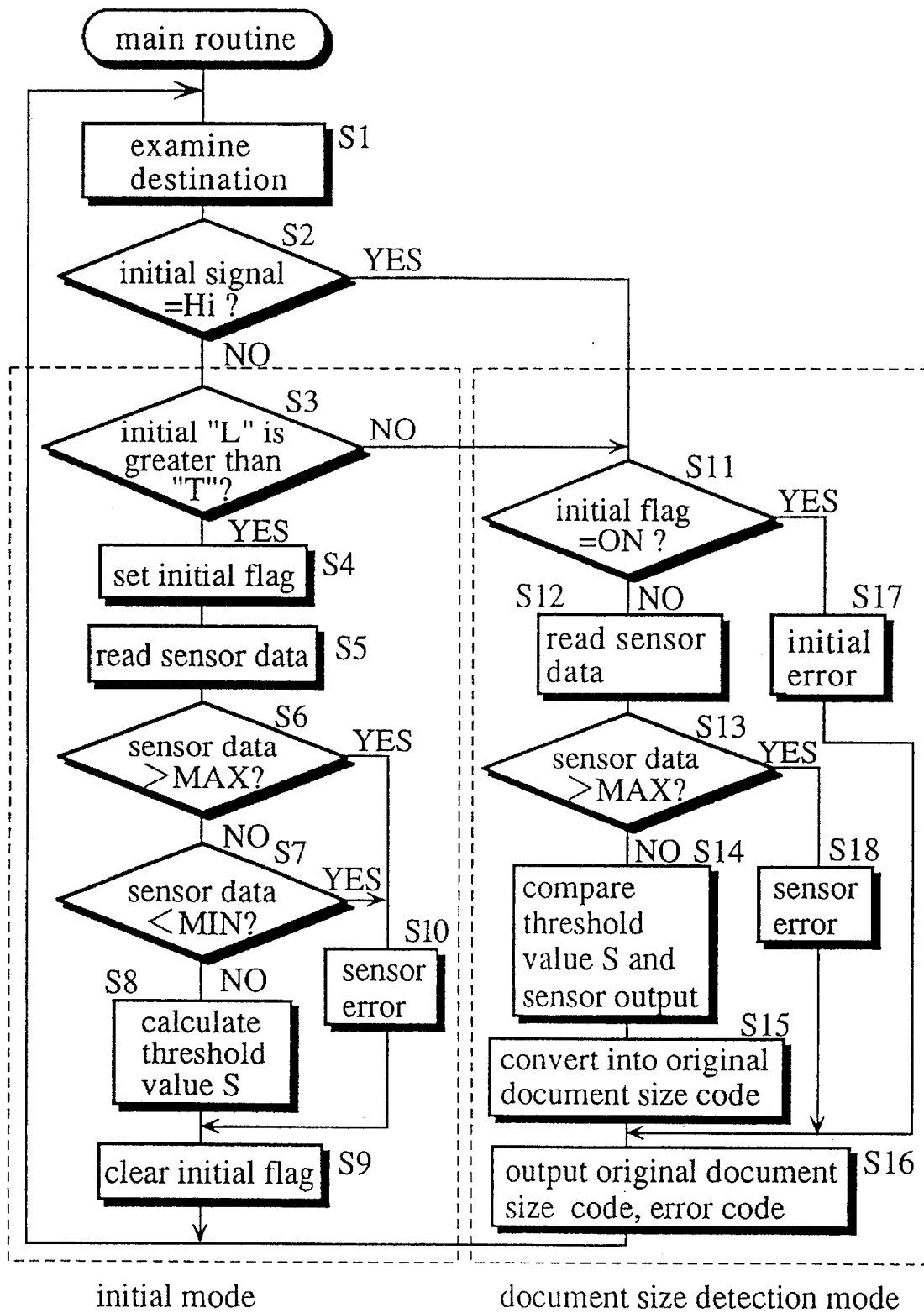
FIG. 17 is a flow chart depicting the main routine of control of the original document size detection CPU 1 in the first embodiment.

FIG. 17 is a flow chart depicting the main routine of control of the original document size detection CPU 1. The CPU 1 operates according to this flow chart so that reading unit operates initial processing (initial mode enclosed with a dot line in FIG. 17) and original document size detection (original document size detection mode enclosed with another dot line in FIG. 17).

When receiving SIM signal from the CPU 2, CPU 1 examines the destination of device. More specifically, it examines if document size of the device is set by centimeter or inch, and re-sets original document size table if necessary (S1). Although the destination is examined every time, it can be examined once. For example, the destination is examined during initial processing and is written into the EEPROM.

Figures 18A, 18B:
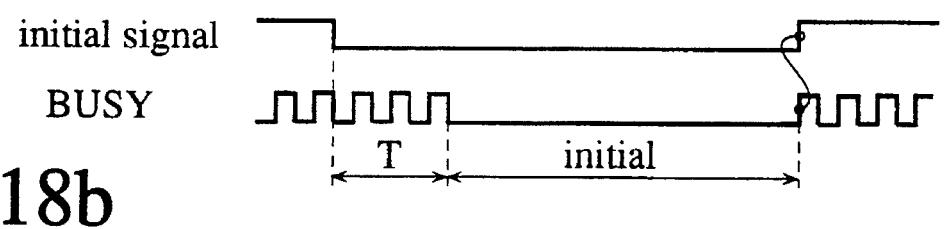
FIG. 18 is a time chart showing data transfer timing in initial mode.

FIG. 18 shows data transfer timings in initial mode. As shown in FIG. 18, initial signal from the CPU 2 being active (LOW) (S2: No) and being longer than standard time T (S3: Yes) indicates that it is set ON (initial processing is directed) so that initial mode processing is executed. This standard time T is included to eliminate noise. About 0.5 sec standard time T eliminates noise sufficiently, and it does not degrade the processing speed. Upon each start of initial processing, BUSY signal to the CPU2 is set LOW level (remains LOW level during initial processing), and initial flag indicative of initial processing is set ON (S4).

Sensor data is read from each distance sensor unit (S5). Sensor output value being greater than a maximum value MAX of standard output (for example, 250 DEC) (S6) or being smaller than a minimum value MIN (for example, 10 DEC) of standard output (S7) represents a sensor error such as a defect sensor or disconnection of a harness (S10).

If every sensor output value is between a maximum value MAX and a minimum value MIN of standard output (S 6 and S7: No), a threshold value S for the LEDs 1 and 2 of each distance sensor unit is calculated from each sensor data, and it is written into the EEPROM (S8). It is possible to write sensor data into the EEPROM beforehand, and calculate a threshold value when detecting the presence/absence of an original document. However, it is more desirable to write a threshold value into the EEPROM after calculation so that the presence/absence of an original document can be detected at a higher speed.

Subsequently, initial flag is reset OFF to complete initial processing (S9). When initial processing is completed, BUSY signal is provided to the CPU 2 again.

On the other hand, initial signal from the CPU 2 being inactive (Hi) (S2: Yes) indicates that initial processing is not directed; accordingly, original document size detection mode starts to detect original document size. Even when initial signal from the CPU 2 is active (LOW), that is set ON (S2: NO), the initial signal indicates an error if it is shorter than standard time T (S3: NO). Accordingly, it is judged that initial processing is not directed, and original document size detection mode starts.

In original document size detection mode, initial flag is examined first (S11). Initial flag being set ON indicates that an error occurs during initial processing, so that error code is outputted (S17).

Initial flag is set ON by inactive initial signal as power is turned off or the original cover 2 is opened during initial processing at S5–S10. In many cases, a threshold value in the EEPROM is not appropriate. The initial flag=ON (set) represents a default value, and it is reset only when initial processing is completed without any error. Therefore, whether or not initial mode processing has been completed safely can be detected as referring to ON/OFF of this initial flag.

Initial flag being OFF at Step 11 represents that initial processing has been completed safely, so that sensor data is read from each distance sensor unit (S12).

It is judged if sensor output value of retrieved sensor data exceeds a preset maximum value MAX (for example, 250 DEC) (S13). Sensor output value being greater than a maximum value MAX represents a sensor error, so that error code is outputted (S18). In original document size detection mode, even sensor data being smaller than a preset minimum value MIN (for example, 10 DEC) does not represent a sensor error. When the original cover 2 is opened by around 90°, a sensor detects any object which is positioned farther than the original cover 2 (for example, ceiling), so that its output value becomes very close to 0. Therefore, if sensor output value being smaller than a minimum value MIN were judged as a sensor error, 90° opening angle of the original cover 2 would also be detected as a sensor error.

By comparing a sensor output value of retrieved sensor data with a threshold value, the presence/absence of an original document at positions (1)–(8) is judged (S14). Then, original document size is determined as referring to this judging result and original document size table. Original document size is then converted into code (S15), and it is transferred to the CPU 2 (S16).

Figure 19:
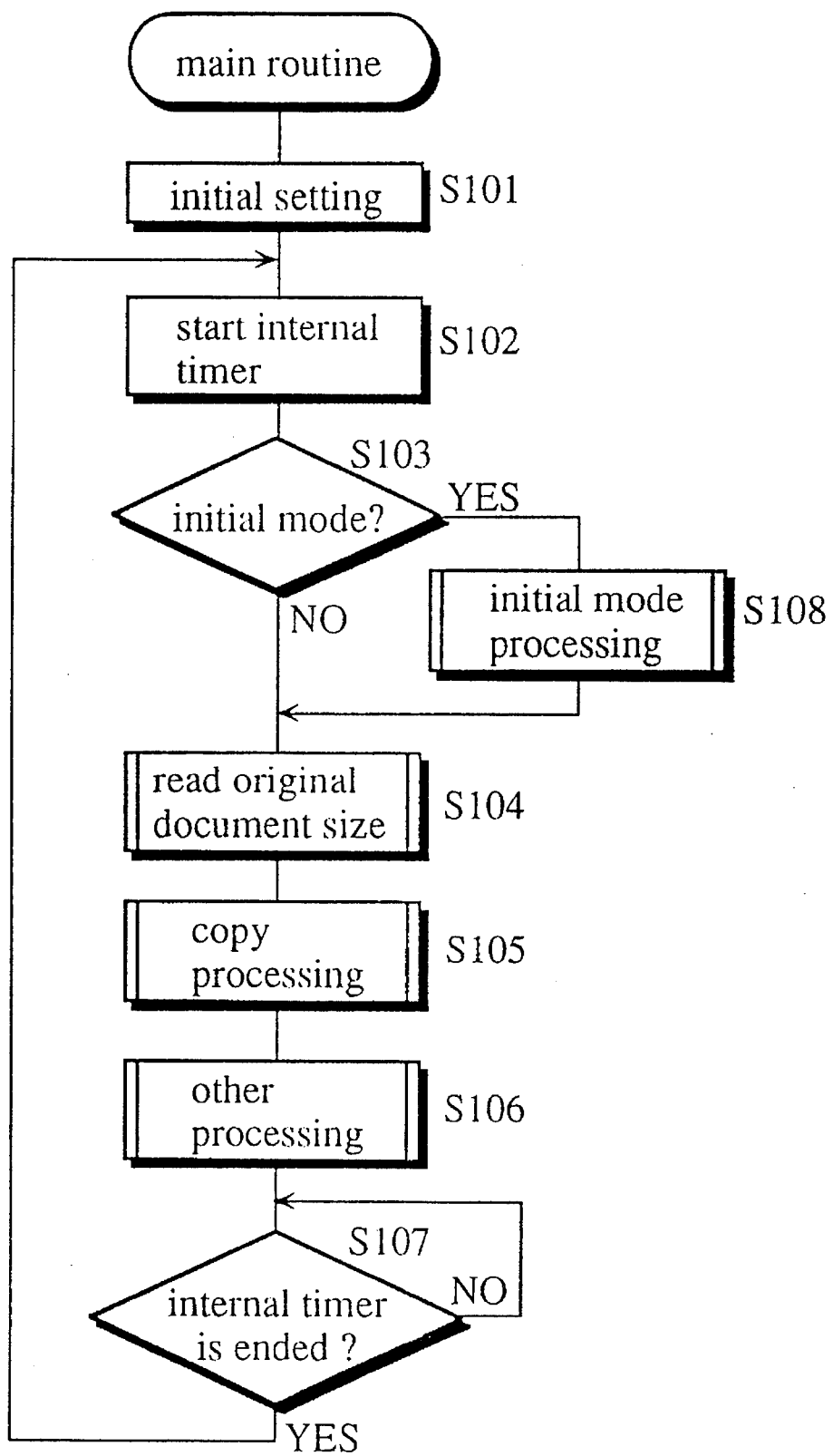
FIG. 19 is a flow chart depicting the main routine of control of a main unit control CPU 2 in the first embodiment.

FIG. 19 is a flow chart depicting the main routine of control of the main unit control CPU 2. The operation of the copy machine main unit 1 is described as referring to this flow chart.

After conducting various initial settings, the CPU 2 starts internal timer (S101 and S102), and judges if the user directs initial mode (by pressing "#" key and start key) (S103). If initial mode is directed (S103: Yes), the CPU 2 activates initial signal (Low level), and implements the initial mode sub-routine (S108).

If initial mode is not directed (S103: No), the original document size reading sub-routine is conducted, and copy processing wherein the CPU 2 controls the reading of an original document and the like is conducted as usual (S104–S106).

Figure 20:
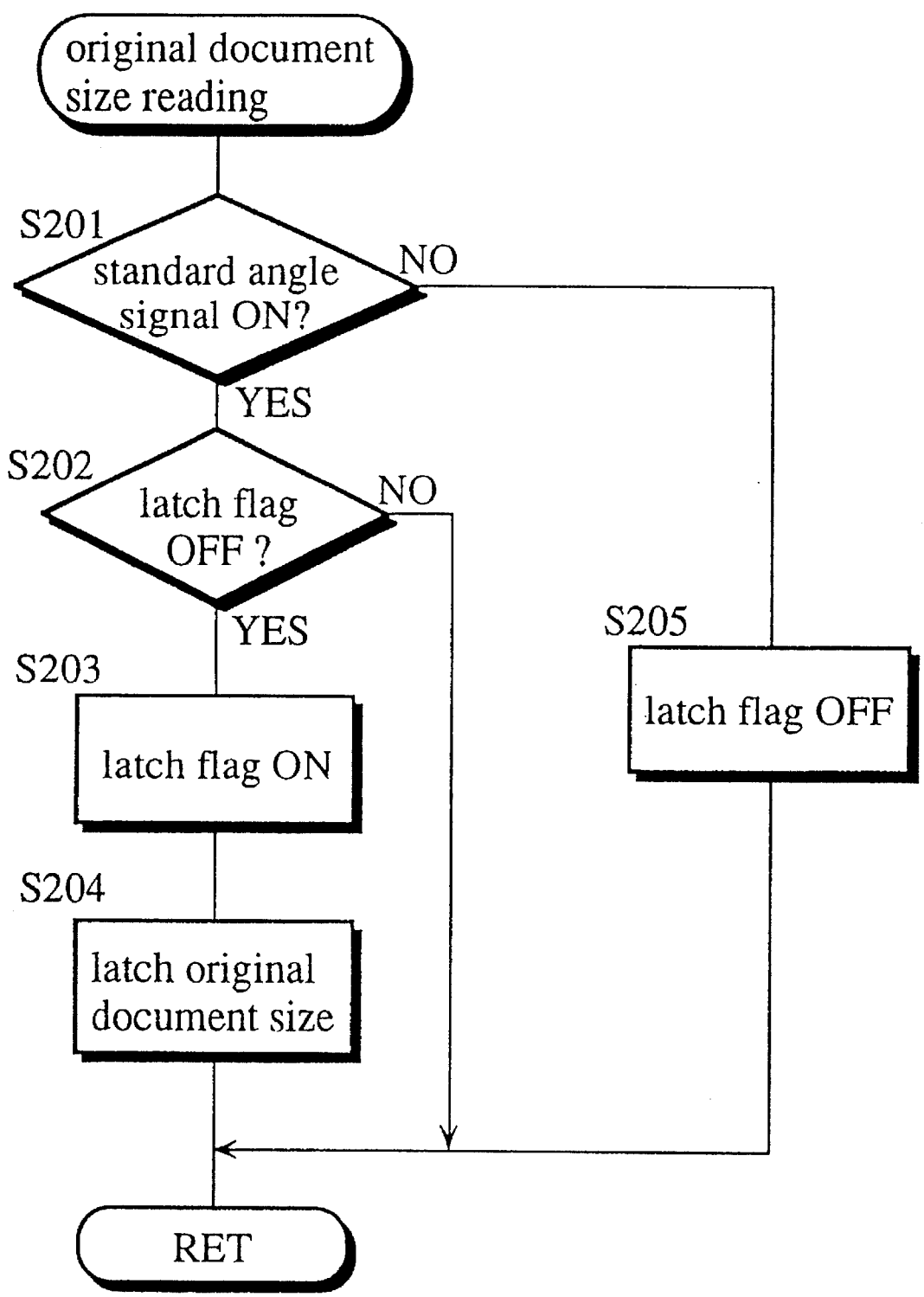
FIG. 20 is a flow chart depicting the sub-routine of original document size reading operation controlled by the main unit control CPU 2 in the first embodiment.
Figure 21:
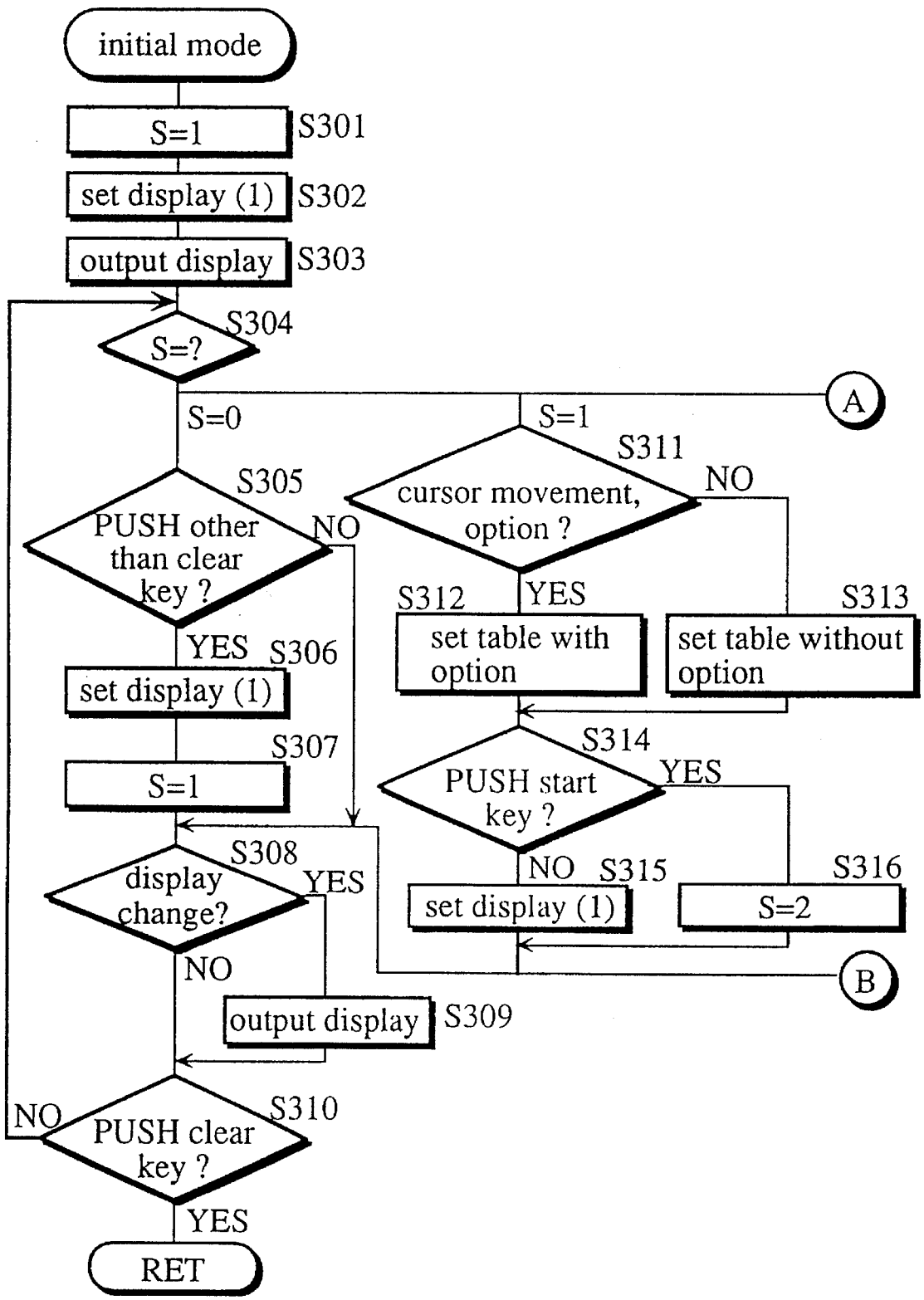
FIG. 21 is a flow chart depicting the sub-routine of initial mode processing controlled by the main unit control CPU 2 in the first embodiment.
Figure 22:
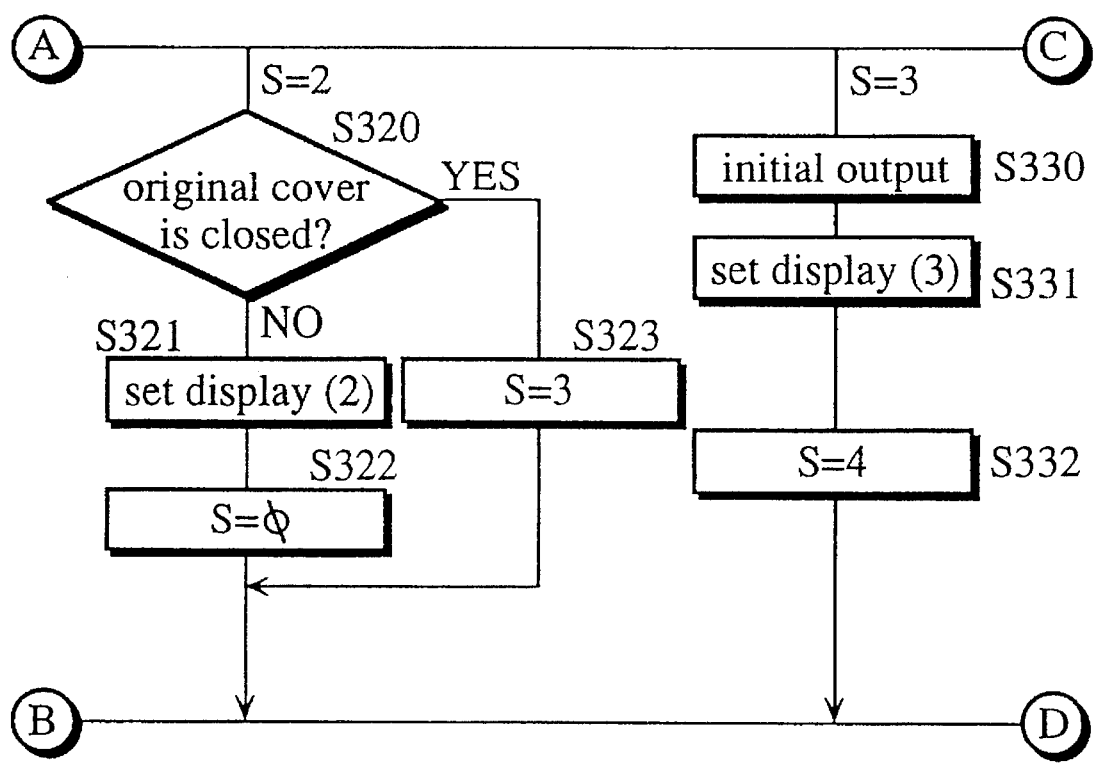
FIG. 22 continues on FIG. 21.
Figure 23:
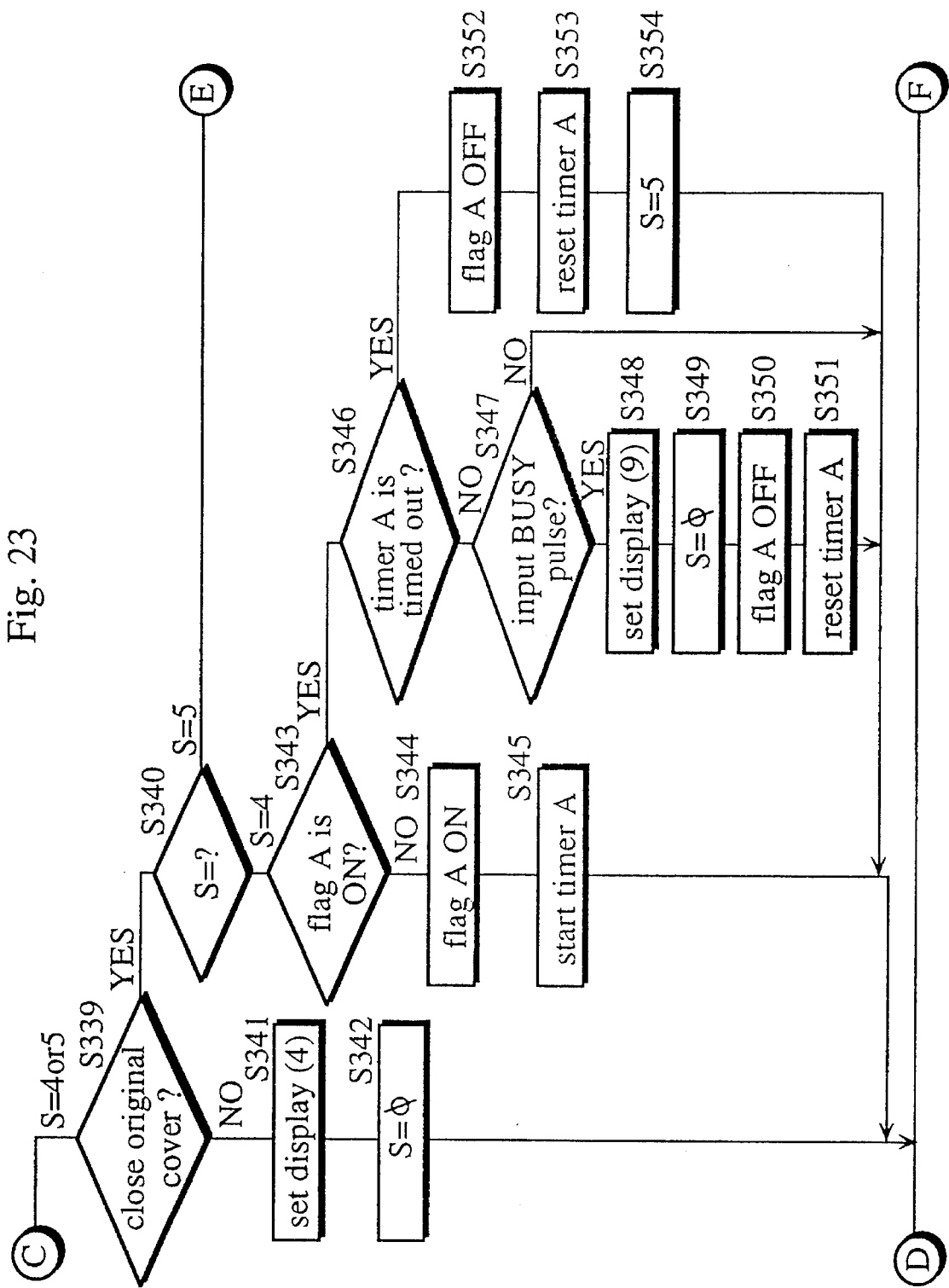
FIG. 23 continues on FIG. 22.
Figure 24:
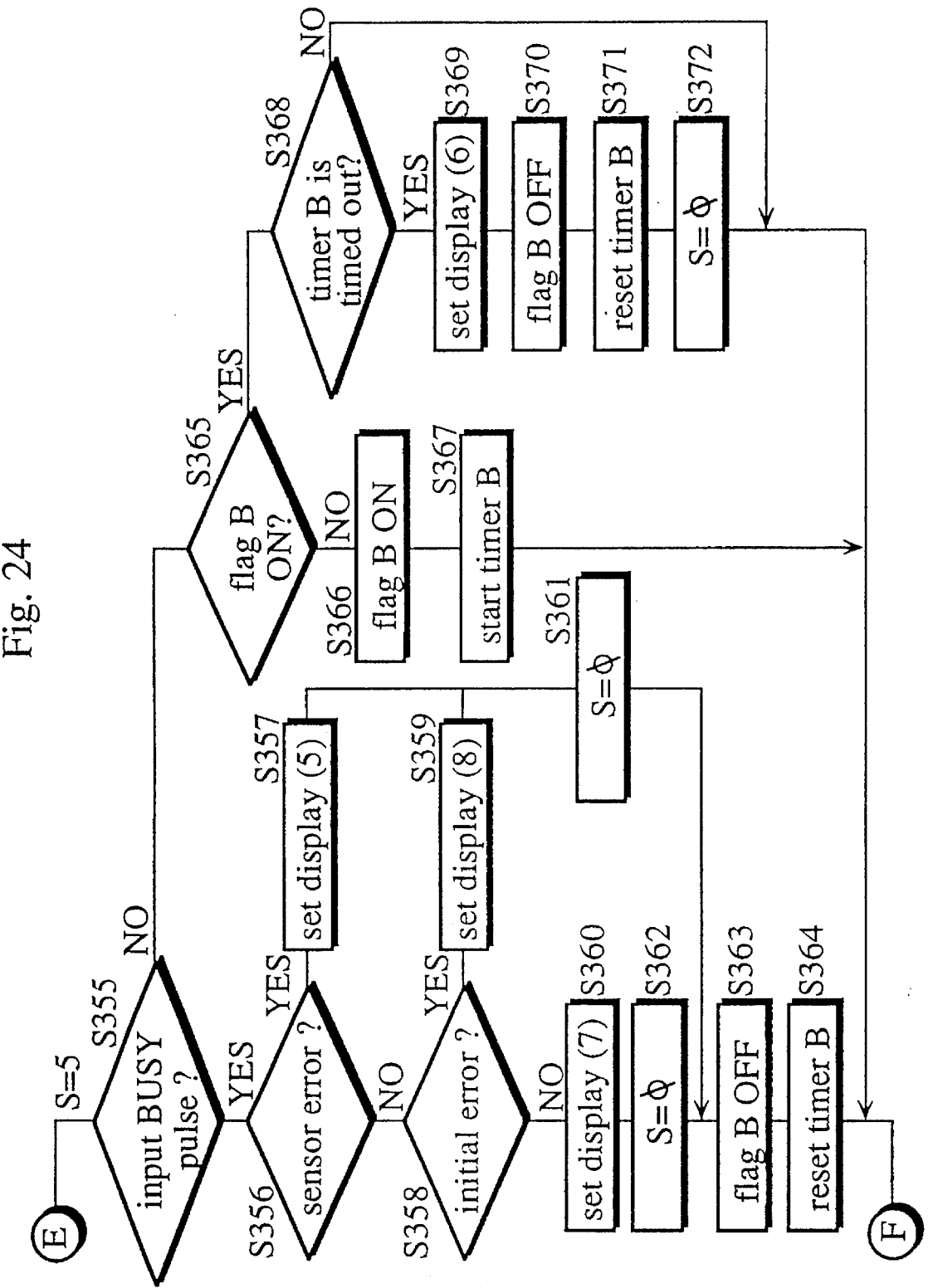
FIG. 24 continues on FIG. 23.

FIG. 20 is a flow chart depicting the original document size reading sub-routine at S104 in FIG. 19. According to this flow chart, the main unit control CPU 2 latches original document size code from the original document size detection CPU 1 as follows.

Upon start of original document size reading mode, the CPU 2 judges if the opening angle of the original cover 2 is smaller than standard angle by examining original cover standard angle signal from the opening angle detecting unit 5 (S201). Original cover standard angle signal being ON (S201: Yes) represents the opening of the original cover 2 being smaller than standard angle, then latch flag is examined (S202). Latch flag being OFF is set to ON (S203) to latch original document size code (S204).

Latch flag directs to latch original document size code after the original cover 2 is closed so that its opening angle becomes standard. More specifically, latch flag being set ON at S202 indicates that original document size code had been latched after the opening angle of the original cover 2 has become standard angle, so that processing at S203 and S204 is not conducted.

When the original cover 2 is opened by more than standard angle (S201: No), latch flag is reset OFF (S205). In this way, original document size data can be latched when the opening angle of the original cover 2 becomes smaller than standard angle.

FIGS. 21–24 show a flow chart of the initial mode sub-routine at S108 in FIG. 19. FIG. 25 shows the display of the liquid crystal display unit LCD in initial mode. Initial mode processing is described as referring to this flow chart and the drawings.

A state counter S is reset "1" (S301), and FIG. 25 (1) is display on the liquid crystal display unit LCD (S302) to encourage the user to select either option sensor or no option sensor with cursor move key (S303).

After operating cursor move key, the user presses start key to direct option sensor or no option sensor.

As referring to state counter S, which step to be conducted first is judged (S304).

When state counter S=1 at S304, the presence/absence of option sensor is judged as referring to the user's direction (S311). If the presence of option sensor is detected (S311:Yes), an original document size table which is designed for the disclosure of option sensor (see FIG. 6(*b*) and FIG. 8(*b*)) is set (S312). If the absence of option sensor is detected (S311: No), an original document size table which is designed for no option sensor [see FIG. 6(*b*) and FIG. 7(*b*)] is set (S313).

If it is judged that the user presses start key (S314: No), the start counter S=2 is set (S316). If it is judged that the user does not press start key (S314: Yes), FIG. 25 (1) is displayed (S315) to encourage the user to select the presence/absence of option sensor.

When state counter S=2 is set at S304, it is checked if the original cover 2 is closed (S320). If the original cover 2 is not closed (S320: No), FIG. 25 (2) is displayed on the liquid crystal display unit LCD (S321) to encourage the user to close the original cover 2, and sets state counter S=0 (S322). When the original cover 2 is closed (S320: Yes), state counter is set S=3 (S323).

When state counter is set S=3 at S304, initial signal is outputted to the CPU 1 (S330). Accordingly, if it is confirmed that the original cover 2 is closed at S320, the CPU 1 starts initial processing. Subsequently, FIG. 25 (3) is displayed on the liquid crystal display unit LCD (S331) to notify the user that initial processing is being conducted. Then, state counter is set S=4 (S332).

When state counter is set S=4 or S=5 at S304, it is checked if the original cover 2 is closed (S339). If it is judged that the original cover 2 is opened (S339: No), FIG. 25 (4) is displayed on the liquid crystal display unit LCD (S341) to direct the user to start initial processing from the beginning. Then, the start counter is set S=0 (S342).

When it is confirmed that the original cover 2 is closed at S339 (S339: Yes), and the state counter is set S=4 at S340, flag A is examined (S343). This flag A indicates that the timer A is counting. The flag A having been set OFF (S343: No) is set ON (S344) to start the timer A (S355). If flag A is set ON (S343: Yes), it is checked if timer A is timed out(S346).

Input of a BUSY pulse before the timer A is timed out (S346: No, S347: Yes) is judged as an error caused by insufficient initial time, so that FIG. 25 (9) is displayed on the crystal liquid display unit LCD to notify the user that an error occurs in initial processing (S348). Then, the state counter S is set 0; the flag A is reset OFF; and the timer A is reset (S349–351).

If it is judged that the timer A has been timed out at S346 (S346:Yes), the flag A is reset OFF; the timer A is reset; and the state counter S is set S=5 (S352–354).

When it is confirmed that the original cover 2 is closed at S339 (S339: Yes) and the state counter is set S=5 at Step 340, it is judged if BUSY pulse is inputted from the CPU 1 (S355). If no BUSY pulse is inputted (S355:No), flag B indicative that timer B is counting is examined (S 365).

If the flag B is set OFF (S365: No), the CPU 2 sets the flag B=ON, and starts the timer B (S366–367). If the flag B is already set ON (S365: Yes), it is checked if the timer B is timed out (S368). The timer B being timed out (S368:Yes) represents an error as initial processing takes long time, so that FIG. 25 (6) is displayed on the liquid crystal display unit LCD to notify the user of an error (S369). Then, the state counter is set S=0; the flag B is rest OFF; and the timer B is reset (S370–372).

If BUSY pulse is inputted before the timer B is timed out at S355 (S355:Yes), a sensor error (S356) and an initial error (S358) are checked. If no error is detected (S355, S356, S358: No), FIG. 25 (7) is displayed on the liquid crystal display unit LCD to notify the user that initial processing was completed safely. Then, the state counter is set S=0 (S360, 362).

FIG. 25 (5) is displayed on the liquid crystal display unit LCD (S357) when a sensor error is detected (S356:Yes), while FIG. 25 (8) is displayed on the liquid crystal display unit LCD (S359) when an initial error is detected (S358: Yes) to notify the user of the respective errors. Then, the state counter is set S=0 (S361).

Although a sensor number is shown by rectangles in FIG. 25 (5), a defect distance sensor unit No. is displayed according to error position code transferred from the CPU 1. Then, the flag B (S363) and the timer B are reset (S364).

When the state counter is set S=0 at S304, it is judged if a key other than clear key is pressed (S305). When another key is pressed (S305:Yes), the state counter is S=1 (S307), and initial display in initial mode (FIG. 25 (1)) (S306) is resumed onto the liquid crystal display unit LCD (S308, S309).

Thus, according to the state counter S, initial mode processing is conducted in order. If clear key is pressed after or during initial processing (S310:Yes), initial mode is terminated, and copy mode at S104 in FIG. 19 starts.

Although initial mode is terminated upon each pressing of clear key in this embodiment, no key operation may be accepted during initial processing.

EMBODIMENT 2

In a second embodiment of the present invention, a copy machine automatically sets a threshold value at appropriate timing besides setting one according to user's direction during initial processing. Also, threshold value is set only when the original cover 2 is closed.

The configuration of such copy machine main unit is substantially same as the copy machine main unit 1 in the first embodiment, but the configuration of a controller is different as follows.

The controller in the second embodiment is substantially same as that in the first embodiment in FIG. 10 except that the CPU 2 provides automatic initial signal indicative of automatic initial processing to the CPU 1 besides initial signal indicative of initial processing. According to these signals, the CPU 1 sets threshold value.

Figure 26:
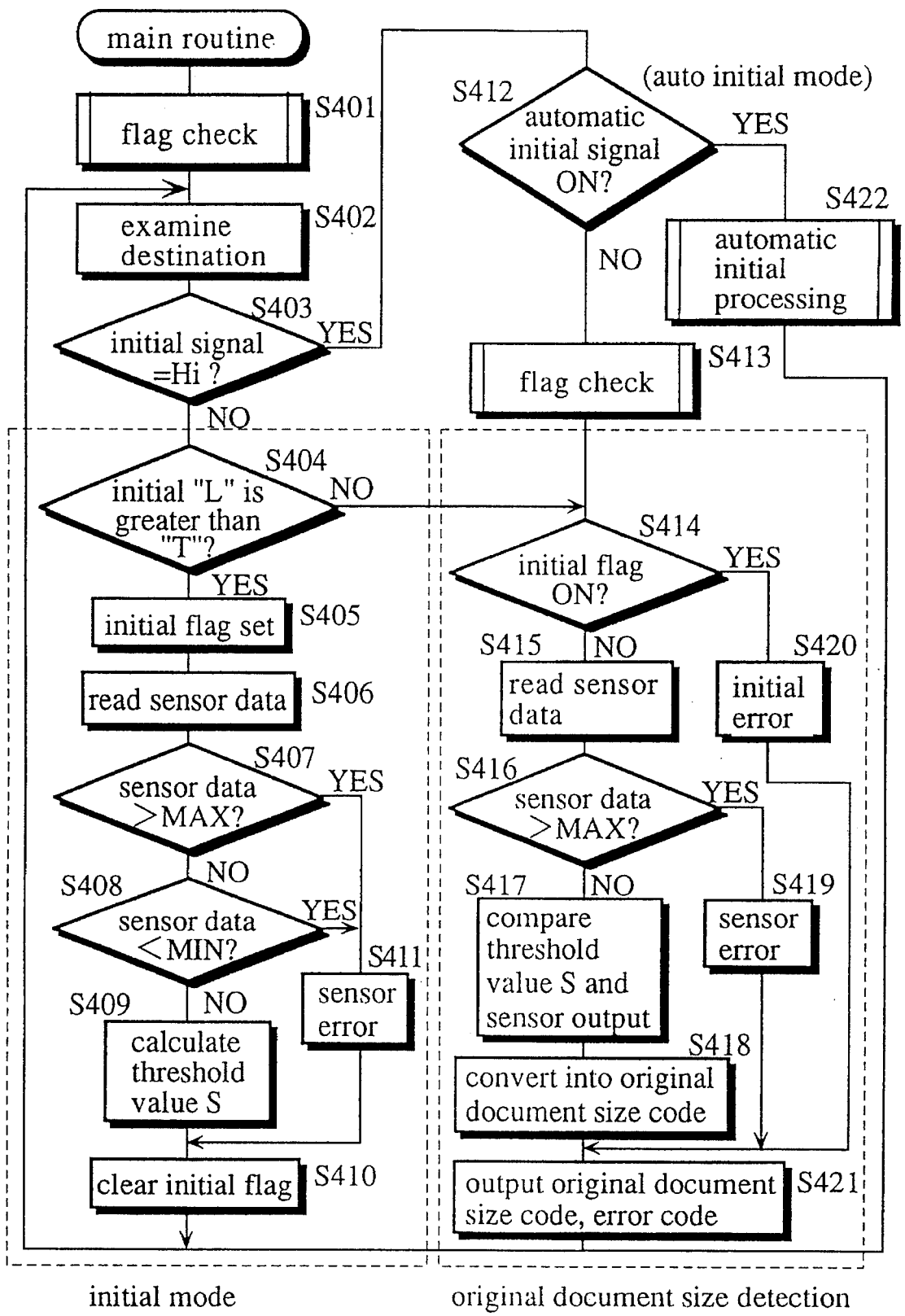
FIG. 26 is a flow chart depicting the main routine of operation of an original document size detection CPU 1 in a second embodiment.
Figure 27:
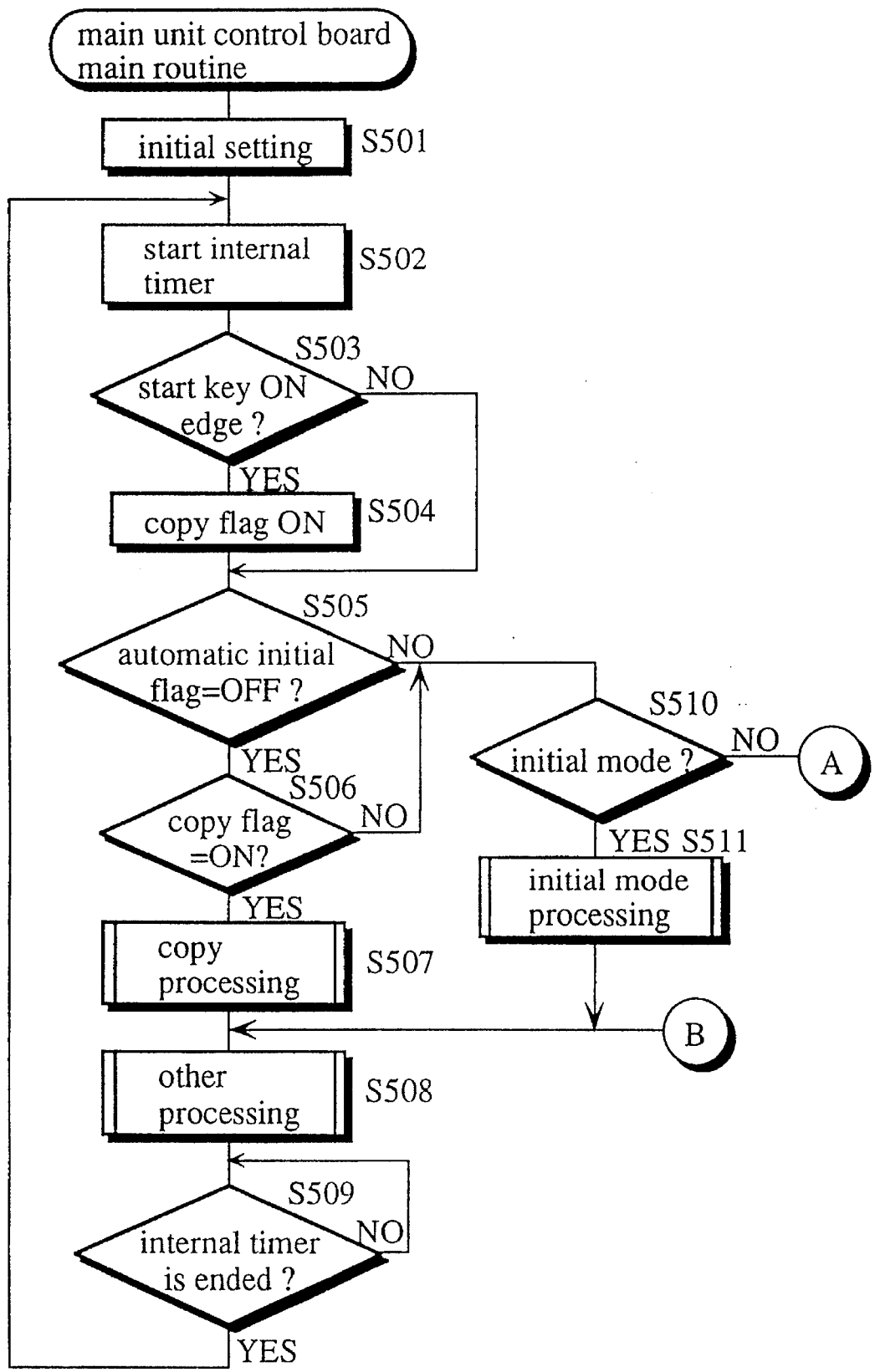
FIG. 27 is a flow chart depicting the main routine of the operation of a main unit control CPU 2 in the second embodiment.

Being similar to the original document size detection CPU 1 and the main unit control CPU 2 operating according to flow charts of FIGS. 17 and 19 in the first embodiment, the original document size detection CPU 1 and the main unit control CPU 2 operate their control processing according to flow charts of FIG. 26 and FIG. 27 respectively in this embodiment.

The operation is described as referring to each flow chart.

FIG. 26 is a flow chart showing the main routine of control processing of the original document size detection CPU 1. According to signal from the CPU 2, initial processing, original document size detection processing, or automatic initial processing is conducted selectively. That is, receiving SIM signal from the CPU 2, flags are examined (S401), and the destination is examined (the same as S1 in the first embodiment) (S402).

Value of a state counter R is set according to flags D, E, F indicative of operation progress of automatic initial processing at S22 which will be described in detail later. According to the state counter R, which step of the automatic initial processing sub-routine at S422 to operate is determined. By examining flags, automatic initial processing can continue even after power is turned OFF during automatic initial processing.

Initial signal from the CPU 2 being active (Low)(S403: No) and longer than standard time T (S404:Yes) directs initial processing, so that initial mode processing is operated (S405–S411). Substantially same as S4–S10 in the first embodiment, sensor data is read and a threshold value is calculated at S405–411.

Initial signal from the CPU 2 being inactive (Hi) at S403 (S403: No) indicates that initial signal is set OFF (initial processing is not directed), further automatic initial signal from the CPU 2 being ON (S412: Yes) indicates that automatic initial processing is directed, so that automatic initial processing is conducted (S422).

Initial signal from the CPU 2 being inactive (Hi) (S403: Yes) and automatic initial signal form the CPU 2 being OFF (S412: No) indicate that neither initial processing nor automatic initial processing is directed, so that original document size detection starts. Even when initial signal from the CPU 2 is active (Low), that is set ON (S403: No), it represents an error if it is shorter than standard time T (S404: No). In this case, it is judged that processing is not directed, so that original document size detection mode starts.

Figure 30:
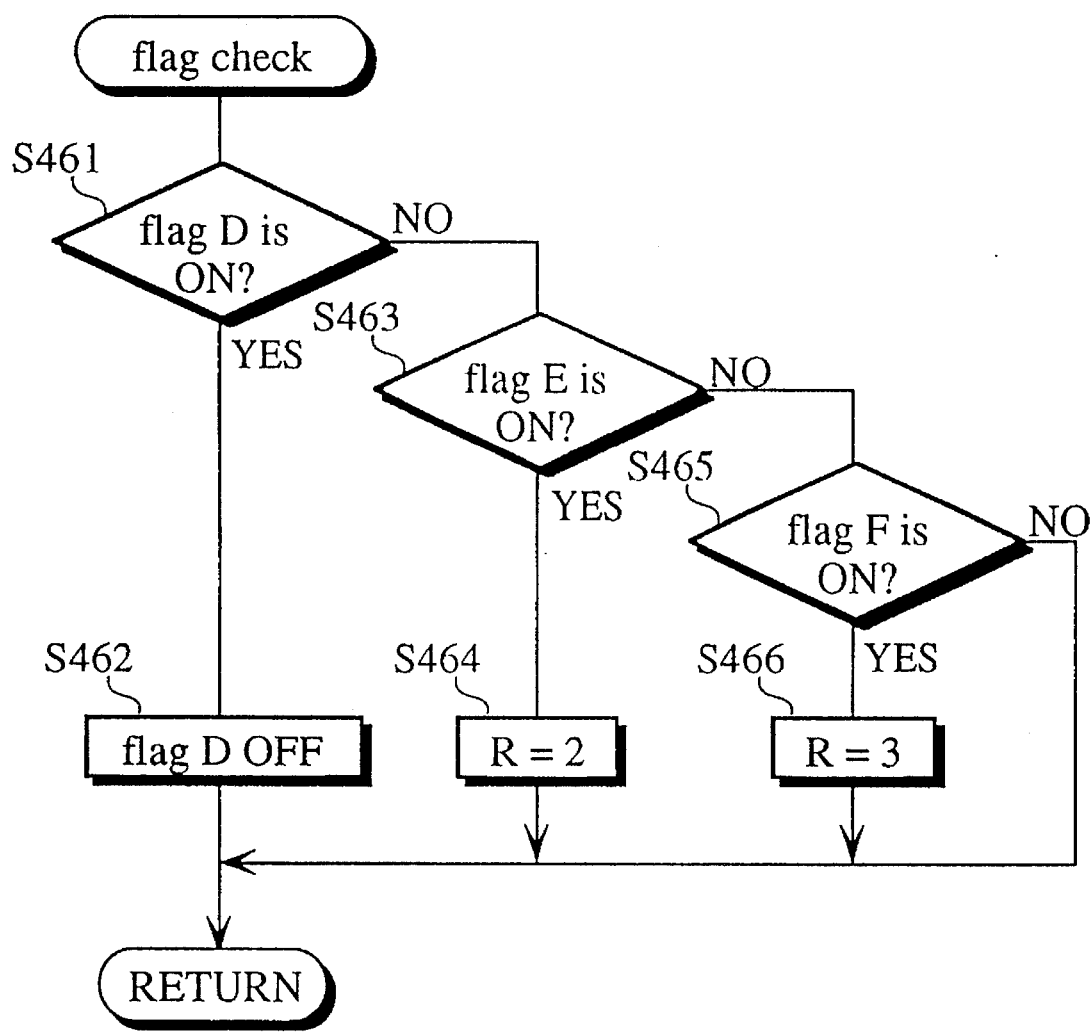
FIG. 30 is a flow chart depicting the sub routine of flag check operation at S401 and S413 in FIG. 26.

Being similar to S401, flags are checked at S413 according to flow chart of FIG. 30. Even when the original cover 2 is opened so that automatic initial processing at S422 is interrupted, the automatic initial processing continues from the point it is interrupted because of this flag check at S413.

Being similar to S11–18 in the first embodiment, data is read from each sensor unit; original document size is detected; original document size is converted into code, and it is transferred to the CPU 2 in original document size detection mode (S414–421).

Figure 29:
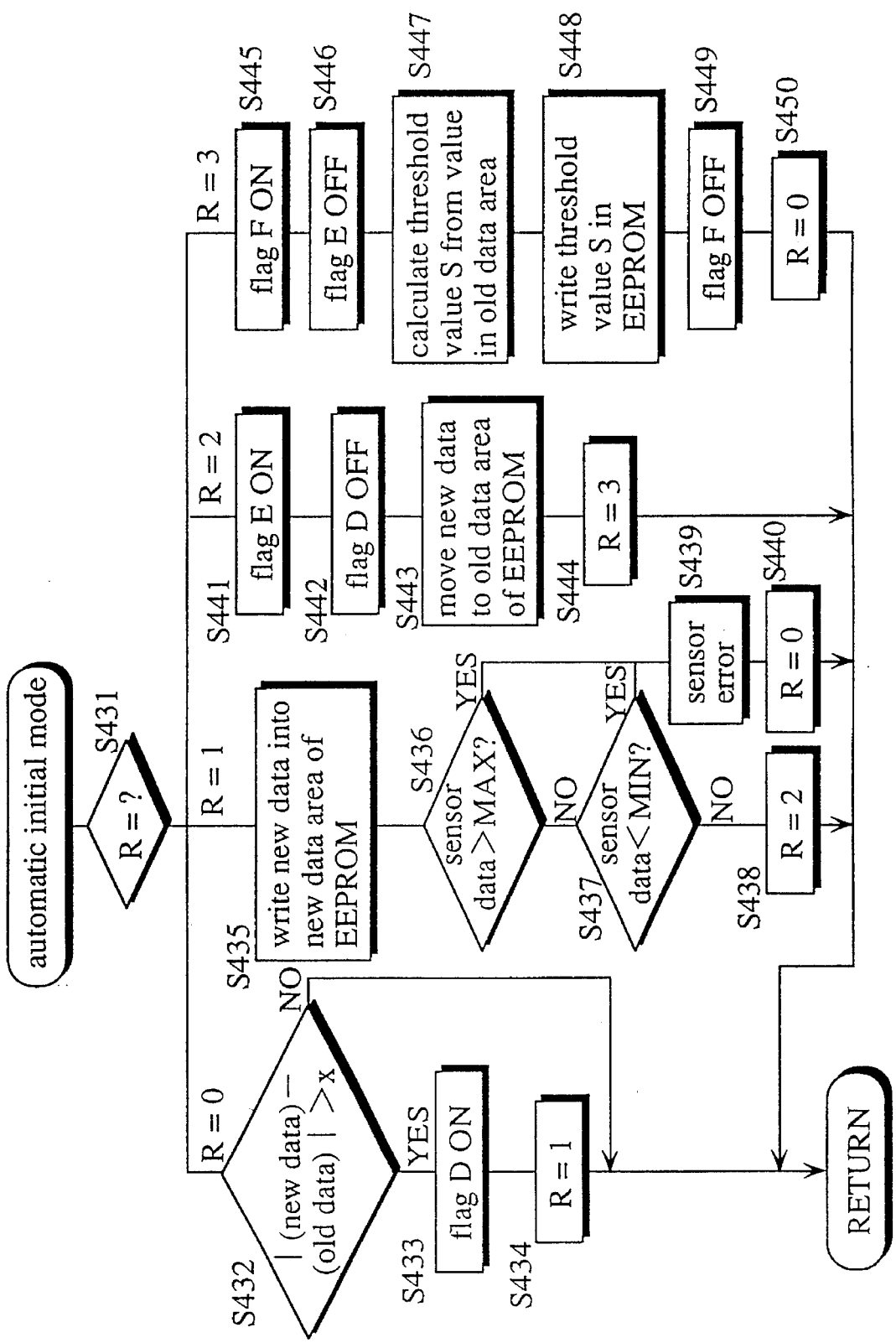
FIG. 29 is a flow chart depicting the sub routine of automatic initial processing at S422 in FIG. 26.

FIG. 29 is a flow chart describing the sub-routine of automatic initial processing at S422 in FIG. 26.

Being the same as initial processing, BUSY signal to the CPU 2 is set LOW level during automatic initial processing. As processing progresses, the state counter R is forwarded 0→1→2→3, and the flags D, E, F which are checked at S401 and S413 are set ON or OFF. As set forth above, even when power is turned off or the original cover 2 is opened during automatic initial processing so that automatic initial processing is interrupted, it continues from the point it is interrupted depending on the progress of processing (S431).

R=0 is set at initial stage. When R=0, data is read from each distance sensor, and this newly read data is compared with old data in the EEPROM which had been employed to calculate current threshold value S. If the difference between new data and old data is greater than standard value X (S432: Yes), the flag D is set ON (S433), and R=1 is set (S434), then automatic initial processing progresses to the next step. If the difference is smaller than standard value X (S432: No), automatic initial processing does not progress but is terminated immediately.

Thus, newly read data is compared to old data, and only when difference between these two data is greater than standard level, data in the EEPROM is rewritten. If the difference is smaller than standard level, it is not rewritten. In this way, automatic initial processing can be conducted more rapidly. Therefore, automatic initial mode is released earlier to start copy mode. Also, data is written into the EEPROM less frequently, so that the EEPROM may acquire a longer life time.

If R=1 at S431, new data is written into a new data area of the EEPROM (S435). Sensor data being grater than a maximum value MAX of standard output (S436: Yes) or being smaller than a minimum value MIN (S437: Yes) is judged as a sensor error (S439), so that R=0 is set to return to initial processing stage (S440). When sensor data is normal (S436, S437: No), R=2 is set to proceed to the next processing stage (S438).

When R=2 at S431, flag E is set ON (S441), flag F is reset OFF (S442), and data in a new data area is moved to an old data area to update data in the EEPROM (S443). Then, R=2 is set to progress to the next processing stage (S444).

When R=3 at S431, the flag F is set ON (S445); the flag E is reset OFF (S446); a threshold value S is calculated from data in the old data area of the EEPROM (S447); and calculated threshold value S is written into the EEPROM (S448). Then, the flag F is reset OFF (S449) and R=0 is set (S450); thus, automatic initial processing is completed. Once it is completed, BUSY signal is transmitted to the CPU 2 again.

FIG. 30 is a flow chart showing the flag check sub-routine at S401 and S413 in FIG. 26.

Either of the flags D, E, F being ON indicates that automatic initial processing is interrupted because power is turned OFF or the original cover 2 is opened during automatic initial processing. Value of the state counter R is determined according to ON, OFF of the flags D, E, F.

The flag D being set ON (S461: Yes) indicates that automatic initial processing is interrupted before data is updated See S433). Therefore, the flag D is changed to OFF without changing the state counter R (S462). Accordingly, automatic initial processing starts with initial stage (R=0) after this interruption.

The flags D, E, F being set OFF (S461, S463, S465: No) indicate that automatic initial processing is not interrupted, or it is interrupted before the flag D is set ON. Therefore, the state counter R is not changed.

The flag E being set ON ( S461: No, S463: Yes) or the flag F being set ON (S461, S463: NO, S465: Yes) indicates that automatic initial processing was interrupted after data has been updated. Therefore, R=2 (S464) or R=3 (S466) is set. Accordingly, automatic initial processing continues from the point it is interrupted.

FIG. 27 is a flow chart depicting the main routine of control of the main unit control board CPU 2. Various initial settings are conducted first (S501). After starting internal timer (S502), if ON edge of start key is detected (S503: Yes), a copy flag indicative of copy processing is set ON (S504).

Automatic initial flag being set OFF and copy flag being set ON (S505, S506: Yes) indicate that the user presses start key and it is not in automatic initial mode, so that copy processing starts (S507). During copy processing, an original document is read, and image is formed and is transcribed. At the end of copy processing, copy flag is reset OFF.

The automatic initial flag being set ON (S505: No) indicates the it is in automatic initial mode, so that it does not progress to S507. Therefore, even if the user presses start key in this state, copy processing is not operated. However, if the automatic initial flag is set OFF at the end of initial mode, copy processing can be operated.

Thus, during automatic initial mode, copy processing is not operated even with start key; therefore, initial processing (threshold value setting) is not interrupted by copy processing (document reading operation) during automatic initial mode.

Neither in initial mode (S505: No) nor in copy processing mode (S506: No), the initial mode setting sub-routine is executed (S511) if the user sets initial mode ("#" key and start key) (S510: Yes). This initial mode processing is operated according to flow charts of FIGS. 21–24.

If neither in automatic initial mode (S505: No) nor in copy processing mode (S506: No), and the user does not set initial mode (S510: No), S521 in FIG. 28 starts.

When a page counter(counter for counting how many times original documents have been read) becomes a predetermined value N (S521: Yes), initial processing is directed (S522–531). In this way, a threshold value is set upon each reading of a predetermined pages of original document automatically. Although initial processing is operated upon each reading of a predetermined pages of original document herein, it may be operated at definite time intervals by using a timer instead of a page counter.

The automatic initial flag being set OFF (S522: Yes) indicates that automatic initial mode has not been operated before; therefore, initial signal to the CPU 1 is set ON to direct initial processing (S525)(See S403), so that automatic initial mode starts. Then, the automatic initial flag indicative of automatic initial mode is set ON (S526), and FIG. 25 (10) is displayed on the LCD to direct the user not to open the original cover 2 (S527).

Initial processing is not directed at S525 until it is confirmed that the original cover 2 is closed and no original document is disposed on the scanning glass 7 (that is, original document size code indicates "no paper" in FIG. 12)(S523, S524: Yes). If the original cover 2 is opened (S523: No) or an original document is disposed on the scanning glass 7 (S524: No), initial processing is not directed.

Therefore, a threshold error which is caused by initial processing with the original cover 2 being opened or with an original document being disposed on the scanning glass 7 is avoided.

After entering automatic initial mode (S522: No), the input of a BUSY pulse from the CPU 2 is awaited as monitoring that the original cover 2 is closed (S528: Yes). The input of BUSY pulse (S529: Yes) indicates that initial processing of the CPU 2 is completed, so that the page counter is cleared (S530), and initial signal to the CPU 1 is reset OFF (S536) to release automatic initial mode. Then, the LCD displays as usual (S537).

If it is detected that the original cover 2 is opened during automatic initial mode (S528: No), the page counter is not cleared, and initial signal is set OFF to direct the CPU 1 to interrupt initial processing (S531), so that automatic initial mode is terminated (S536, 537). Since the page counter remains unchanged, S521 is answered positively (S521: Yes). Accordingly, the above steps S522, 523 . . . are repeated again.

Thus, automatic initial processing is interrupted upon opening of the original cover 2. Therefore, a threshold value error which is caused by the opening of the original cover 2 during initial processing is avoided. Automatically, a threshold value is set from the beginning.

When the page counter does not reach N (S521: No) and the original cover 2 is closed, automatic initial mode is operated as follows (S532–S543).

The automatic initial flag being set OFF (S532: No) indicates that automatic initial mode has never been conducted before. Therefore, after confirming that the original cover 2 is closed and no original document is disposed on the scanning glass 7 (S539, S540: Yes), automatic initial signal to the CPU 1 is set ON (See S403) to enter automatic initial mode. Then, the automatic initial flag is set ON to indicate of automatic initial mode (S542), and FIG. 25 (10) is displayed on the LCD (S543) to direct not to open the original cover 2. To be noted, if the original cover 2 is opened (S539: No) or an original document is disposed on the scanning glass 7 (S540: No), automatic initial processing is not directed.

Thus, automatic initial processing is not directed until it is confirmed that the original cover 2 is closed and no original document is disposed on the scanning glass 7. In this way, a threshold error which would be caused by initial processing with the original cover 2 being open or with an original document being disposed on the scanning glass 7 is avoided.

Original document size is read at S538 by implementing the original document size reading sub-routine (the same as flow chart of FIG. 20 relating to the first embodiment). However, when the original cover 2 is closed, standard angle signal is set OFF (S201 in FIG. 20: No), so that the latch of original document size at S204 in FIG. 20 is not operated.

Once the automatic initial flag is set ON (S532: Yes), it is judged that automatic initial mode starts, so that the input of BUSY pulse from the CPU 1 is awaited as monitoring that the original cover 2 is closed (S533: Yes). The input of BUSY pulse (S534) indicates that initial processing of the CPU 1 is completed, so that initial signal to the CPU 1 is turned OFF (S535). Then, automatic initial mode is released by resetting automatic initial flag OFF (S536). Simultaneously, usual copy mode is displayed on the LCD (S537).

If it is judged that the original cover 2 is opened during automatic initial mode (S533: No), initial signal to the CPU 1 is set OFF to interrupt automatic initial processing (S535); accordingly, automatic initial mode is terminated (S536).

Thus, automatic initial processing is interrupted upon the opening of the original cover 2. Therefore, a threshold error which would be caused by the opening of the original cover 2 is avoided.

In the original document size reading sub-routine at S538 (the same as flow chart of FIG. 20 relating to the first embodiment), an original document size code is latched when the opening angle of the original cover 2 becomes standard angle (See S201–205 in FIG. 20 relating to the first embodiment).

Various key inputs, such as the input of start key are accepted during other processing (S508).

In addition, ON or OFF of the automatic initial flag indicative of automatic initial mode is detected to prevent copy processing during automatic initial mode (S505: No) in this embodiment. Similarly, it is possible to prevent copy processing during initial mode by examining ON or OFF of the flag indicative of initial mode.

As set forth above, with the original document reading device in this embodiment, a threshold value is set manually by the user or is set automatically by the device only when the original cover is closed. Stated otherwise, a threshold value is not set with the original cover being open. Therefore, a threshold value is set accurately by preventing a threshold error which would be caused by the opening of the original cover 2.

EMBODIMENT 3

Being similar to the second embodiment, initial processing and automatic initial processing are conducted in a third embodiment, but initial processing is not operated during original document reading.

The configuration of a copy machine main unit relating to this embodiment is substantially same as that in the second embodiment. Also, being the same as the second embodiment, controller transfers "automatic initial signal" from the CPU 2 to the CPU 1.

The original document size detection CPU 1 operates according to flow chart of FIG. 26 which relates to the second embodiment, and the description is not repeated.

Figure 28:
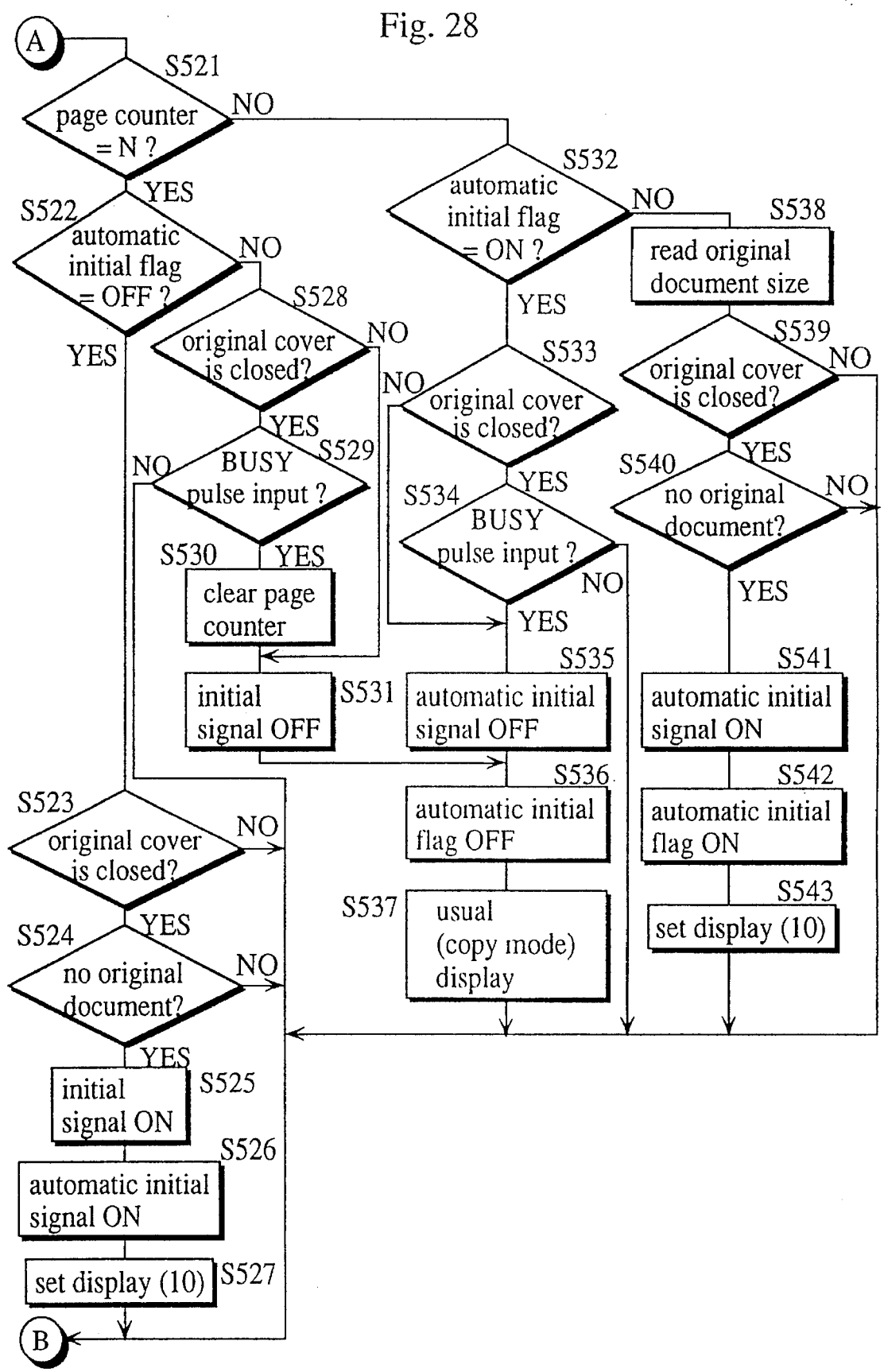
FIG. 28 continues on FIG. 27.

The main unit control CPU 2 operates according to flow chart of FIG. 27, then according to flow chart of FIG. 28 in the second embodiment. The main unit control CPU 2 in the third embodiment operates according to flow chart of FIG. 31 instead of FIG. 27 in the first half, then operates according to flow chart of FIG. 28 in the latter half. The main unit control unit CPU 2 operates according to flow charts of FIGS. 31 and 28 as follows.

Figure 31:
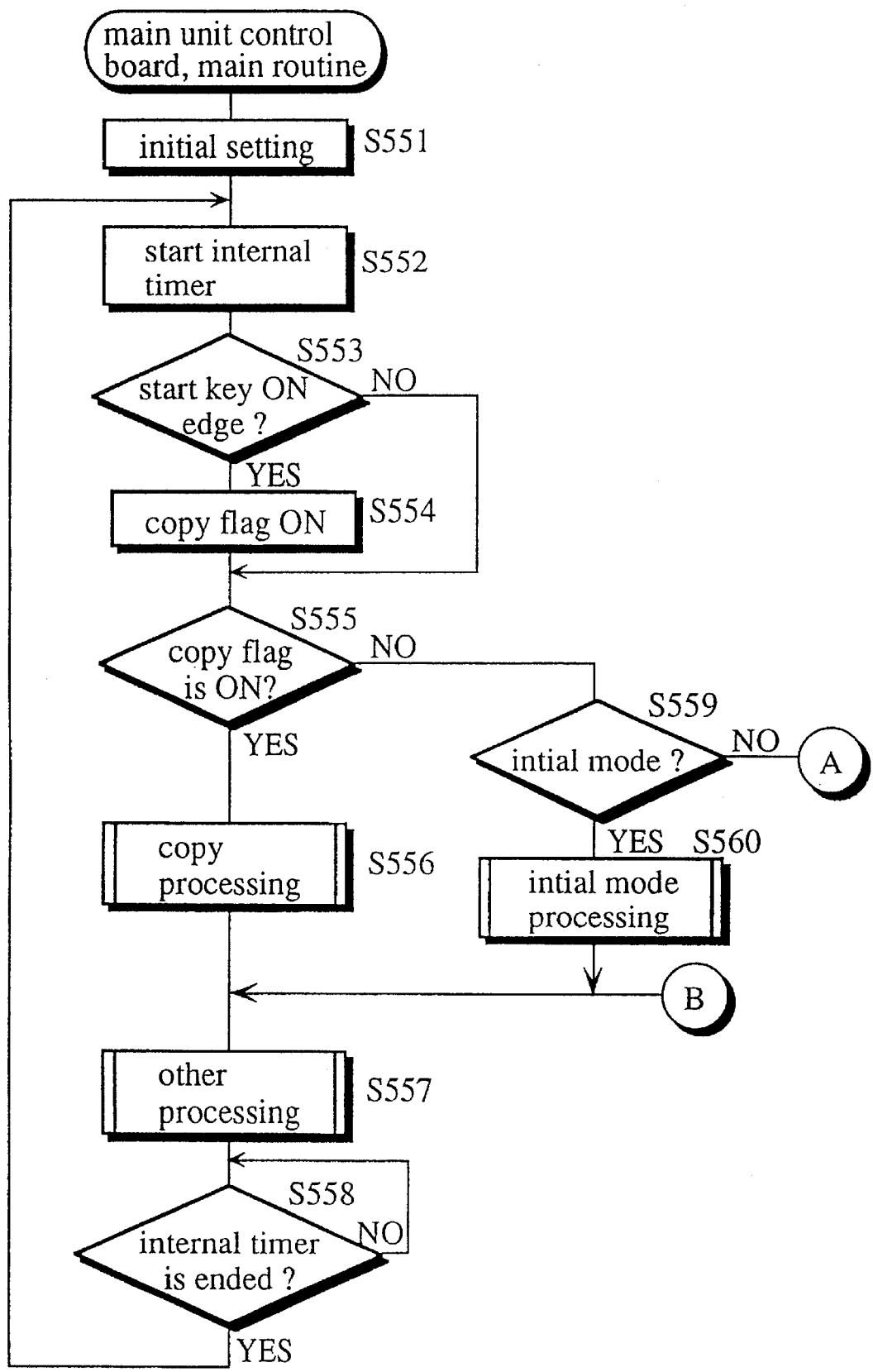
FIG. 31 is the first half part of a flow chart describing control of a main unit control CPU 2 in a third embodiment.

According to flow chart of FIG. 31, various initial settings are operated first (S551), and internal timer starts (S552). Then, if start key indicates ON edge (S553: Yes), copy flag indicative of copy processing is set ON (S554).

Copy flag being set ON (S555: Yes) indicates that the user presses start key, so that copy processing is implemented (S556). At the end of copy processing, the copy flag is reset OFF.

With the copy flag being set OFF (S555: No), the initial mode processing sub-routine is operated if the user directs so (S559: Yes) (same as FIGS. 21–24 in Embodiment 1), or processing in FIG. 28 is operated substantially same as the second embodiment if the user does not direct initial mode (S559: No).

Thus, S559 is not operated until the copy flag is reset OFF as it is judged that the copy flag=ON (Yes) at S555 continues. Therefore, neither initial mode processing at S560 nor automatic initial mode processing at S521–543 in FIG. 28 does not start during copy processing. When the copy flag is reset OFF at the end of copy processing, S559 starts.

Thus, in this embodiment, initial processing is not implemented during copy processing even when the user directs initial processing with a key. Therefore, entering initial processing during copy processing by mistake is prevented.

EMBODIMENT 4

In a fourth embodiment a threshold value is set by selecting data which is within a preset range from sensor data which is collected after repeating reading predetermined times, and the other automatic initial processing is the same as the second embodiment.

The configuration of a copy machine main unit relating to the fourth embodiment is substantially same as that relating to the second embodiment.

Figure 32:
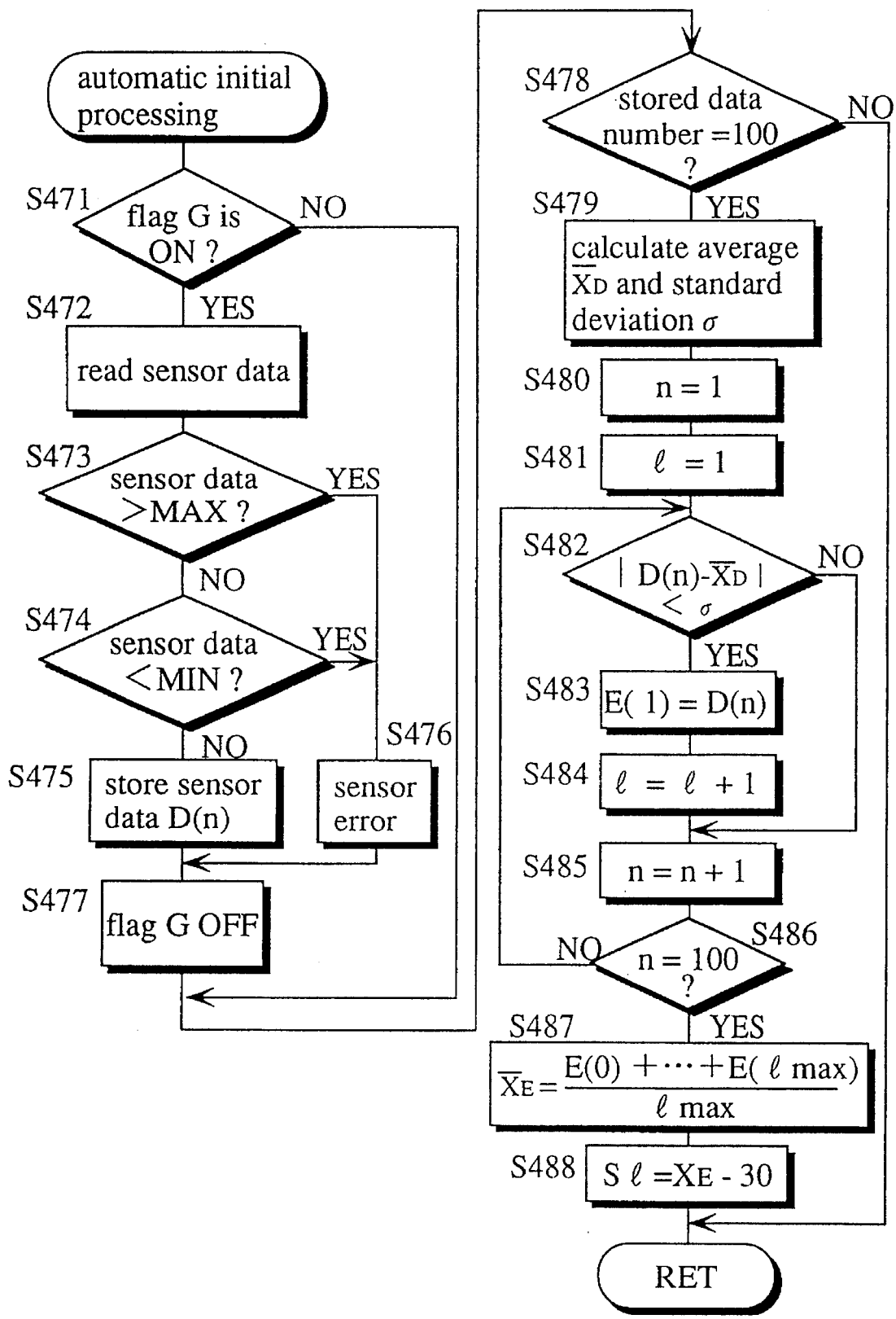
FIG. 32 is a flow chart describing the sub-routine of automatic initial processing in a fourth embodiment.
Figure 33:
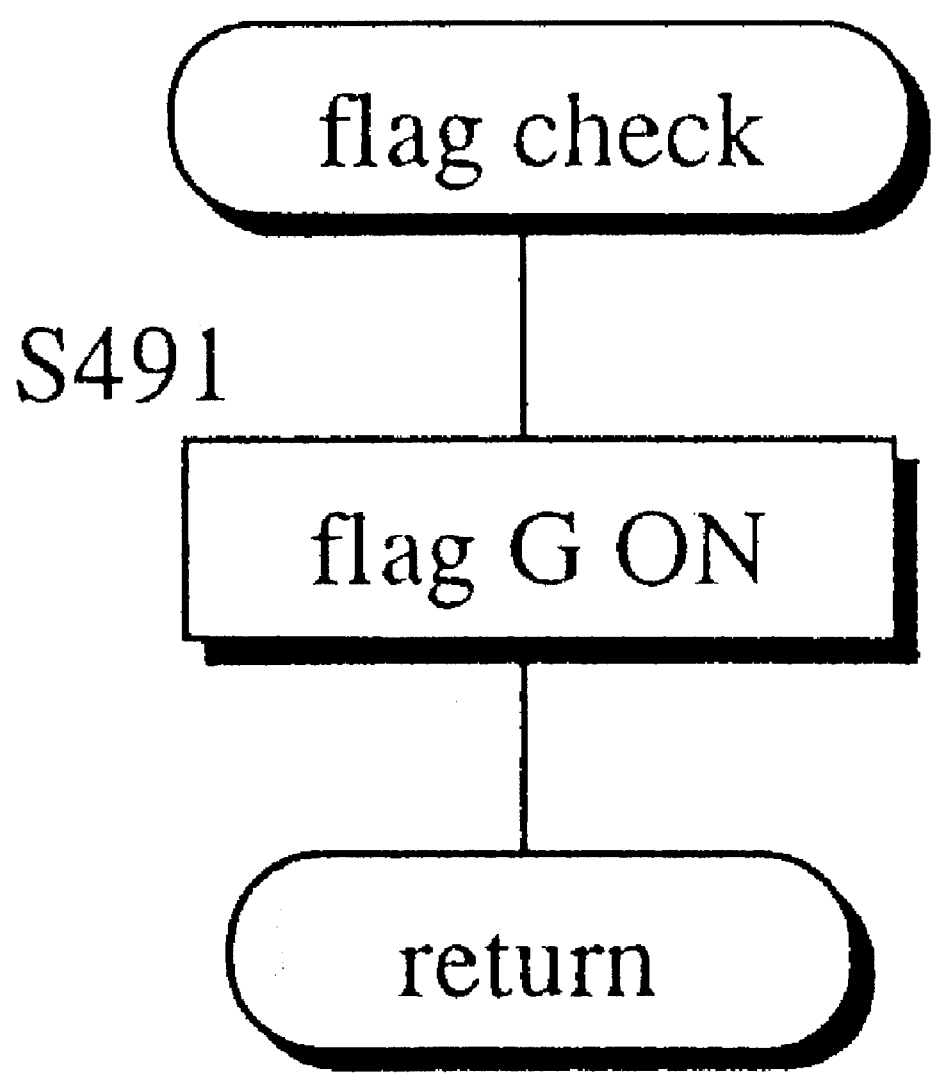
FIG. 33 is a flow chart describing the sub-routine of flag check operation in the fourth embodiment.

The original document size detection CPU 1 operates according to flow chart of FIG. 26 relating to the second embodiment, except that automatic initial processing at S422 is operated according to FIG. 32 instead of FIG. 29, and flag check at S401 and 403 is operated according to FIG. 33 instead of FIG. 30.

FIG. 32 is a flow chart describing the automatic initial setting sub-routine at S422 in FIG. 26. In this sub-routine, sensor data is stored upon each start of automatic initial processing.

When flag G is set ON (S471: Yes), data is read from each distance sensor (S472). If sensor data D (n) is between a maximum value MAX and a minimum value MIN of standard output (S473, S474: No), it is stored (S475). After storing sensor data, the flag G is reset OFF (S477). To be noted, sensor data being greater than a maximum value MAX of standard output (S473: Yes) or being smaller than a minimum value MIN of standard output (S474: Yes), it is judged as a sensor error, so that it is not stored.

The flag G is set ON (S491) according to flow chart of FIG. 33 during flag check at S401 and S413 in FIG. 26, and is reset OFF at the end of reading (S477). Thus, data is read only when the flag G is ON (S471: Yes), so that sensor data is read and stored only once when automatic initial signal from the CPU 2 is ON.

This storing of sensor data is repeated (repeated when S478: No) until the number of data stored reaches a predetermined number (100 herein). Once data reaches a predetermined number (S478: Yes), an average XD and a standard deviation σ of sensor data D (n) are calculated (S479).

It is examined that the difference between each sensor data D (n) and an average XD is smaller than a standard deviation σ, and sensor data D (n) is substituted to E(1) only when it is different from the average XD by the standard deviation σ or smaller (S482–S486).

An average XE of sensor data E (1) within the standard deviation is calculated (S487), and a threshold value S is calculated according to this average XE (S488).

Being the same as the second embodiment, the main unit control CPU 2 operates according to flow charts of FIGS. 27 and 28, and the description is not repeated.

Thus, data within a standard deviation is selected from sensor data collected by repeating the reading predetermined times, and a threshold value is calculated in accordance with an average of selected sensor data. Consequently, an accurate threshold value is set.

EMBODIMENT 5

In a fifth embodiment, power supply to each distance sensor is turned off to cease its measuring operation when the opening angle of original cover is less than standard angle with the copy machine relating to the first embodiment.

The configuration of a copy machine main unit is substantially same as that of the copy machine main unit 1 in the first embodiment except the following configuration of a controller.

The controller in this embodiment is the same as the controller in the first embodiment in FIG. 10 except that "a distance measuring signal" which indicates if the original cover 2 is opened by more than standard angle is transferred from the CPU 2 to the CPU 1 besides "initial signal" and "SIM signal".

Figure 34:
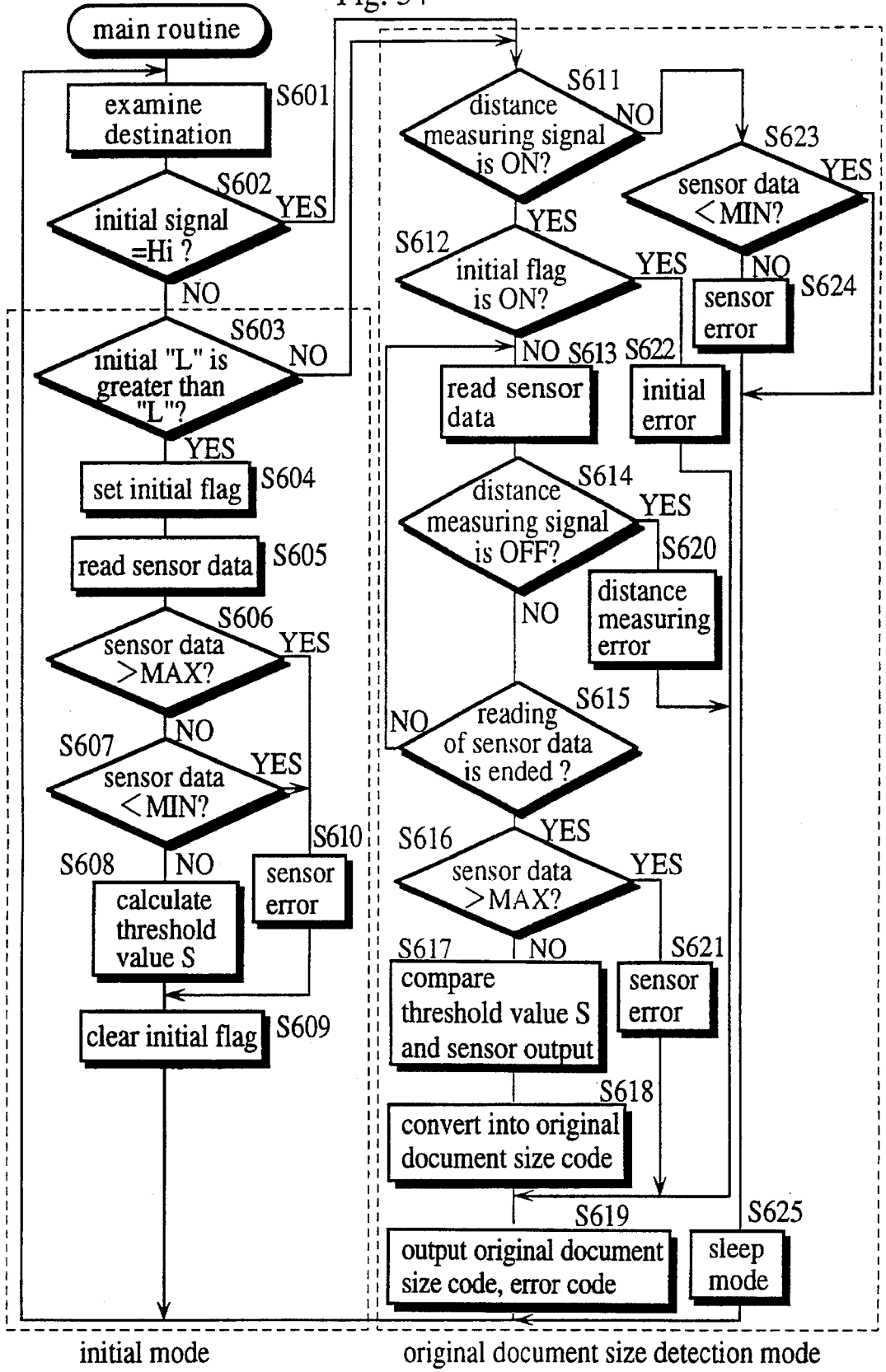
FIG. 34 is a flow chart describing control of an original document size detection CPU 1 in a fifth embodiment.

Although the original document size detection CPU 1 operates according to flow chart of FIG. 17 in the first embodiment, the original document size detection CPU 1 operates according to flow chart of FIG. 34 in this embodiment. The main unit control CPU 2 operates according to flow chart of FIG. 19 in the first embodiment except that document size reading processing at S104 in FIG. 19 operates according to flow chart of FIG. 35 instead of flow chart of FIG. 20.

The operation is described according to each flow chart.

FIG. 34 is a flow chart depicting the main routine of control of the original document size detection CPU 1. According to signal from the CPU 2, the original document size detection CPU 1 implements either initial processing or original document size detection processing.

Being the same as S1 in the first embodiment, when receiving SIM signal from the CPU 2, the destination is examined (S601). Being the same as S2 and S3 in the first embodiment, the CPU 1 implements initial mode processing if initial signal from the CPU 2 is active (Low) (S2: No) and it is longer than standard time T (S3: Yes).

Being the same as S4–S10 in the first embodiment, sensor data is read and a threshold value is calculated as initial mode processing (S604–610).

Initial signal from the CPU 2 being inactive (Hi) (S602: Yes) indicates that initial processing is not directed, so that original document size is detected. Even initial signal from the CPU 2 being active (Low) (S602: No) represents an error if it is shorter than standard time T. Accordingly, it is judged that initial processing is not directed, so that original document size detection mode is implemented.

In original document size detection mode, distance measuring signal from the CPU 2 is examined (S611). Distance measuring signal being ON indicates that the original cover 2 is opened by more than standard angle. Then, initial flag is examined. The initial flag being set ON (S612: Yes) indicates that an error occurs in initial processing (S622), so that error code is outputted (S619).

The initial flag being set ON indicates that a threshold value in the EEPROM is improper because power is turned off or the original cover 2 is opened. Herein, default value of the initial flag represents ON (set), and the initial flag is reset OFF only when initial processing is completed safely. In this way, it can be checked if initial mode processing is completed to the end safely.

The initial flag being set OFF (S612: No) indicates that initial processing is completed safely; accordingly, sensor data is read from each distance sensor unit (S613–615)

During sensor data reading, it is checked if distance measuring signal is set OFF constantly. The distance measuring signal being set OFF (S614: Yes) indicates that the opening angle of the original cover 2 becomes smaller than standard angle before the reading of sensor data from each distance sensor unit is completed (that is, a distance measuring error occurs) (S620), so that error code indicative of shortage of distance measuring time [see FIG. 14(*b*)] is outputted (S619).

If the reading of sensor data is completed (S615: Yes) before distance measuring signal is set OFF (S614: No), being the same as S13–16 in the first embodiment, it is checked if output value of retrieved sensor data exceeds a maximum value of standard output (S616). Then the presence/absence of an original document is judged by comparing this sensor output value with a threshold value (S617). According to this judging result and an original document size table, original document size is judged, then it is converted into code (S618), and it is transferred to the CPU 2 (S619).

Distance measuring signal being OFF at S611 indicates that the original cover 2 is opened by less than standard angle, so that sleep mode starts (S625). The output value of sensor data being smaller than a preset minimum value MIN of standard output (S623: Yes) is judged as a sensor error, so that sensor error code is outputted (S624).

During sleep mode processing at S625, power supply to each distance sensor unit is turned off and clock signal CLK from the CPU 1 is lowered; otherwise, original document size detection of the CPU 1 is ceased.

If original document size detection of the CPU 1 is ceased by sleep mode, transmission of original document size code to the CPU 2 is also ceased. However, it is possible to continue original document size detection of the CPU 1 even in sleep mode by latching original document size code and sending it to the main unit control CPU 2.

Whether or not the output value of sensor data is smaller than a minimum value MIN of standard output is checked accurately at S623 and S624 by confirming that check distance measuring signal is OFF (S611: No). To judge a sensor error simply by comparing the output value of sensor data with a minimum value MIN cannot avoid the following problem. That is, when the original cover 2 is opened by around 90°, distance sensor unit detects any object which is located farther than the original cover 2 (such as ceiling), so that sensor output value becomes very close to 0. Consequently, it is judged as a sensor error by mistake. Such misjudge can be avoided by implementing the judging only when distance measuring signal is set OFF.

Figure 35:
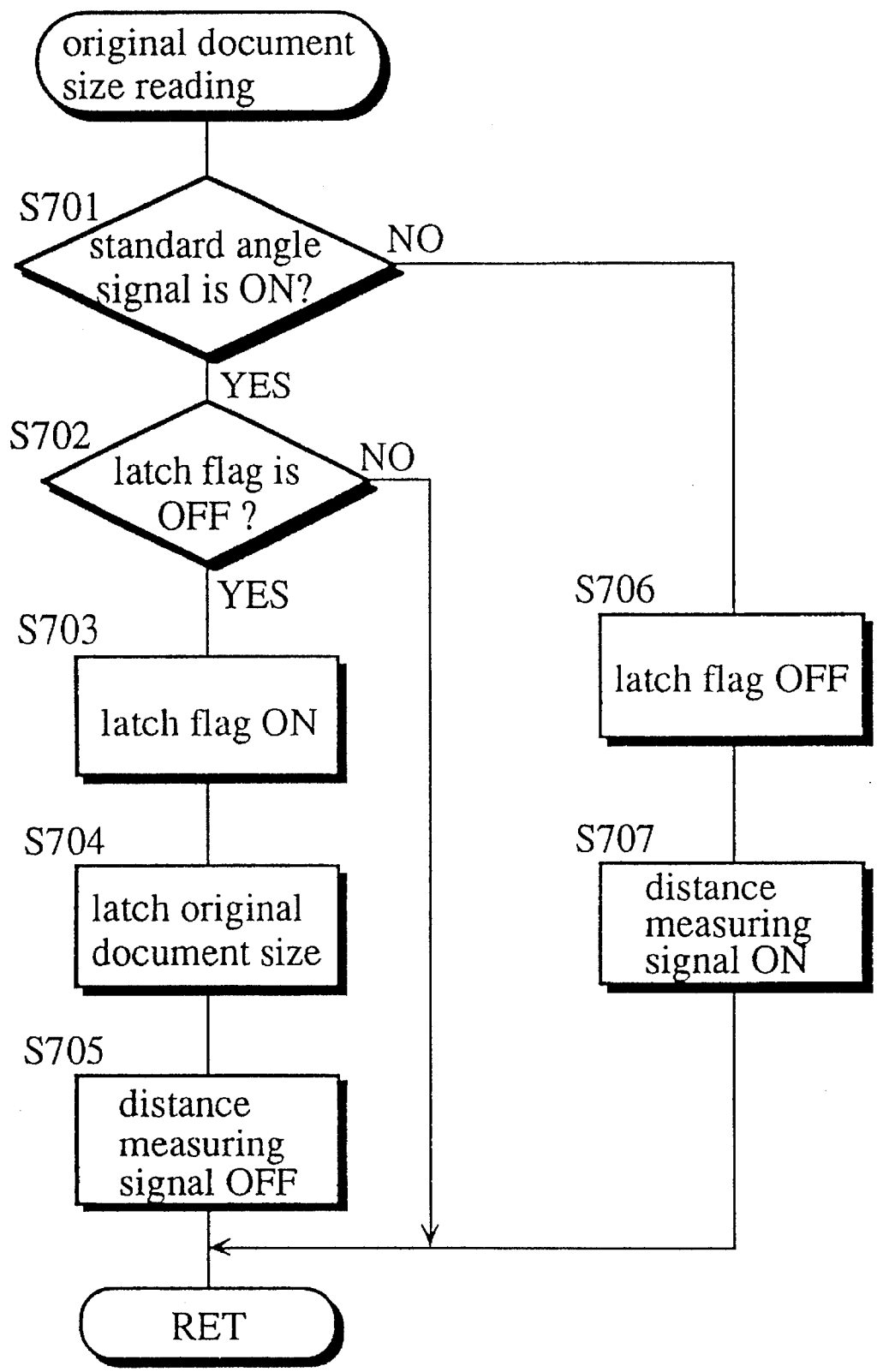
FIG. 35 is a flow chart describing the sub-routine of original document size reading operation in the fifth embodiment.

FIG. 35 is a flow chart showing the original document size reading sub-routine at S104 in flow chart of the main unit control CPU 2 in FIG. 19.

Being the same as S201–205 in the first embodiment, the main unit control CPU 2 latches original document size code from the original document size detection CPU 1, and informs if the original cover 2 is opened by more than standard angle by setting distance measuring signal ON or OFF. This processing is described hereunder.

In reading original document size, original cover standard angle signal from the angle detecting unit 5 is examined. Original cover standard angle signal being ON (S701: Yes) indicates that the original cover 2 is opened by less than standard angle, so that latch flag is examined. Latch flag being set OFF (S702: Yes) is set ON (S703), and original document size code is latched (S704). Then, distance measuring signal is set OFF to inform the CPU 1 that the opening angle of the original cover 2 is less than standard angle (S705).

The latch flag being set ON (S702: No) indicates that original document size code is latched after the original cover 2 was closed so that the opening angle had became less than standard angle. Therefore, S703–704 are not operated.

When the original cover 2 is opened by more than standard angle (S701: Yes), the latch flag is reset OFF (S706) and distance measuring signal is set ON so that original document size data can be latched if the opening angle of the original cover 2 becomes less than standard angle (S707), then informs the CPU 1 that the original cover 2 is opened by more than standard angle currently.

Thus, in this embodiment, if the original cover 2 is opened by less than standard angle during original document size detection mode, it is converted into sleep mode. Therefore, power consumption of device is reduced, and degrading of the light emitting strength of LED is eased as well.

The original cover 2 can be opened and closed around axis freely, and sleep mode processing starts when the opening angle becomes less than standard angle. The original cover 2 may be opened and closed in different manners. For example, the original cover 2 may move in parallel to close and open itself.

EMBODIMENT 6

In a sixth embodiment, the opening angle of original cover is measured by a distance sensor with the copy machine in the first embodiment.

The configuration of a copy machine main unit in this embodiment is substantially same as the that in FIG. 1 relating to the first embodiment except that the opening angle detecting unit 5 is not included. Also, a controller is substantially same as that in FIG. 10 relating to the first embodiment except that original cover standard angle signal is transferred from the CPU 1 to the CPU 2, instead of being transferred from the opening angle detecting unit 5 to the CPU 2.

Detection of the opening angle of the original cover 2 according to distance information from a distance sensor unit is described.

Herein, the opening angle of the original cover 2 is detected with a distance sensor unit constructed in a preset position of the original document reading unit, and the output value of this distance sensor unit has characteristics shown by initial detection curve (O.D value=0.05) in FIG. 15. When no original document is disposed on the scanning glass 7 and the original cover 2 is opened by standard angle, the output value of data which is latched corresponds to a distance B to the original cover 2 (shown by point X in FIG. 15, and referred to as standard sensor output value hereunder) is outputted. Therefore, when no original document is disposed on the scanning glass 7 and sensor output value from this distance sensor unit is greater than the standard sensor output value, it is judged that the opening angle of the original cover 2 is smaller than standard angle. On the other hand, if sensor output value from the distance sensor unit is smaller than the standard sensor output value, it is judged that the original cover 2 is opened by more than standard angle.

The opening angle of the original cover 2 cannot be detected in accordance with distance information if an original document is disposed on a position of the scanning glass 7 which corresponds to the distance sensor unit. That is, the light from the distance sensor unit must be reflected by the original cover 2. Therefore, to measure the opening angle of the original cover 2 based on sensor data from the distance sensor unit which is set for original document size detection, original document must be removed from the scanning glass 7 if any. Otherwise, the opening angle cannot be measured. This problem is solved by the following features of the sixth embodiment. Hereunder, distance sensor units are disposed as shown in FIG. 6; however, they may be positioned as shown in FIGS. 7 or 8.

When the optional distance sensor unit FD3 is not employed, the opening angle of the original cover 2 is detected according to the light illuminating a position (3) of the distance sensor unit FD2 and the light illuminating a position 7 of the distance sensor unit CD1. If either of the lights has sensor output value being smaller than the standard sensor output value, it is judged that the original cover 2 is opened by more than standard angle.

When the optional distance sensor unit FD3 is employed, the opening angle of the original cover 2 is detected according to the light illuminating a position (5) of the distance sensor unit FD3 and the light illuminating a position (7) of the distance sensor unit CD1. The opening angle is directed as set forth above. Therefore, either of the lights is reflected by the original cover 2, and is sensed unless a maximum size original document (A3T) is disposed on the scanning glass 7, so that the opening angle of the original cover 2 can be measured.

Only when a maximum size original document (A3T) is disposed on the scanning glass 7, the opening angle of the original cover 2 cannot be measured, so that data latch timing is not obtained. A maximum size original document (A3T) is also detected so that its copy can be made (see S905–912 in FIG. 37).

Thus, the opening angle of the original cover 2 is judged by comparing sensor output value from the distance sensor unit with standard sensor output value in this embodiment. Therefore, the opening angle of the original cover 2 can be detected without constructing a photo interpreter. Since, a distance sensor unit can measure distance information accurately for a long time, the opening angle of original cover can be detected precisely for a long time. A plurality of distance sensor units are constructed to measure different original document sizes, and the distance sensor units FD2 or FD3 and CD1 of them are also used to detect the opening angle of original cover. Thus, the opening angle of original cover can be detected without increasing distance sensor units.

The operation is described as referring to flow charts.

Figure 36:
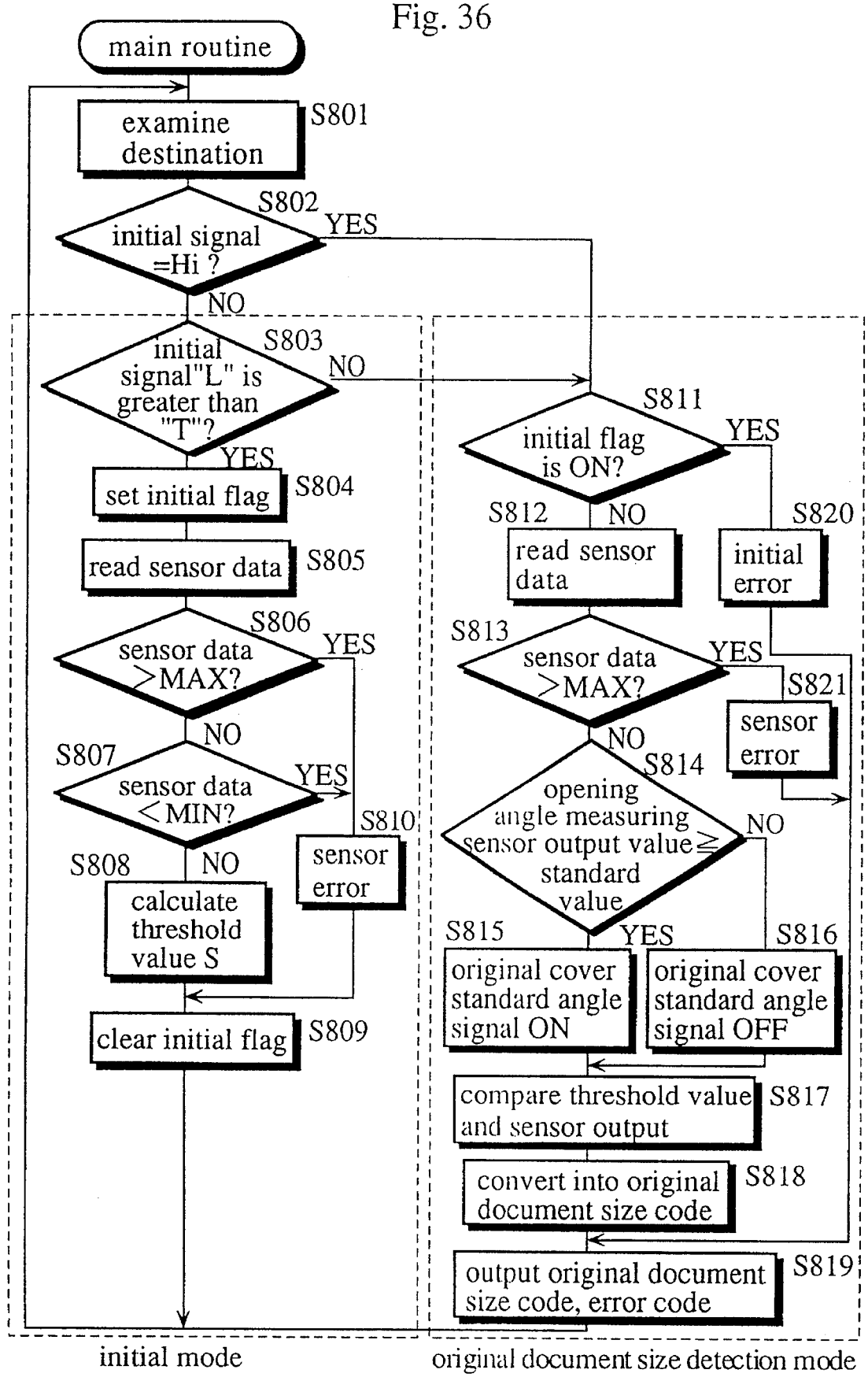
FIG. 36 is a flow chart describing control of an original document size detection CPU 1 in a sixth embodiment.

Although the original document size detection CPU 1 controls according to flow chart of FIG. 17 in the first embodiment, the CPU 1 controls according to flow chart of FIG. 36 in this embodiment. Although the main unit control CPU 2 controls according to flow chart of FIG. 19 in the first embodiment, the CPU 2 controls according to flow chart of FIG. 37 in this embodiment.

FIG. 36 is a flow chart describing the operation of the original document size detection CPU 1 which includes initial processing (initial mode enclosed with a dot line) and original document size detection processing (original document size detection mode enclosed with another dot line).

S801–S809 are the same as S1–S9 in the first embodiment. That is, when SIM signal is received from the CPU 2, the destination of device is examined (S801). When initial signal from the CPU 2 is active (Low)(S802: No) and it is longer than standard time T (S803: Yes), initial mode processing is implemented. Also, BUSY signal to the CPU 2 is set Low level, and initial flag indicative of initial processing is set ON (S804).

Sensor data is read from each distance sensor unit (S805). Sensor output value being greater than a maximum value MAX of standard output (S806: Yes) or being smaller than a minimum value MIN of standard output (S807: Yes) is judged as a sensor error (S810).

If sensor output value is between a maximum value MAX and a minimum value MIN (S806 and S807: No), a threshold value is calculated for the LED1 and LED2 of each distance sensor unit, and it is written into the EEPROM (S808). Then, the initial flag is reset OFF (S809) to complete initial processing. After completing initial processing, BUSY signal is outputted to the CPU 2 again.

Initial signal from the CPU 2 being inactive (Hi) (S802: Yes) indicates that initial processing is not directed, so that original document size detection processing is implemented. Initial signal from the CPU 2 being active (Low) (S802: No) is judged as an error if it is shorter than standard time T (S803: No). It is judged that initial processing is not directed, so that original document size detection is implemented.

S811–S813 and S820 for original document size detection mode are the same as S11–S13 and S20 in the first embodiment. That is, the initial flag is examined (S811). The initial flag being set ON (S811: Yes) indicates that an error occurs during initial processing (S820), so that error code is outputted (S819). The initial flag being set OFF (S811: No) indicates that initial processing is completed safely, so that sensor data is read from each distance sensor unit (S812).

The output value of retrieved sensor data being greater than a maximum value MAX of standard sensor output (S813: Yes), is judges as a sensor error (S821), so that error code is outputted (S819).

By detecting if sensor output value for opening angle detection is smaller than standard sensor output value, if the original cover 2 is opened by more than standard angle is judged (S814). More specifically, with disposition in FIG. 6, if both the light illuminating a position (3) of the distance sensor unit FD2 (or the light illuminating a position (5) of the distance sensor unit FD3) and the light illuminating a position (7) of the distance sensor unit CD1 are greater than standard sensor output value (S814: Yes), it is judged that the original cover 2 is opened by less than standard angle, so that original cover standard angle signal to the CPU 2 is set ON (S815). If either of the lights is smaller than standard sensor output value (S814: No), it is judged that the original cover 2 is opened by more than standard angle, so that original cover standard angle signal is set OFF (S816). Thus, during original document size detection mode, original cover standard angle signal is set ON when the original cover 2 is opened by less than standard angle, and it is set OFF when the original cover 2 is opened by more than standard angle.

By comparing the output value of retrieved sensor data with a threshold value, the presence or absence of an original document at each position (1)–(8) is judged (S817). Original document size is judged according to this comparing result and an original document size table, then it is converted into code (S818), and it is transferred to the CPU 2 (S819).

Figure 37:
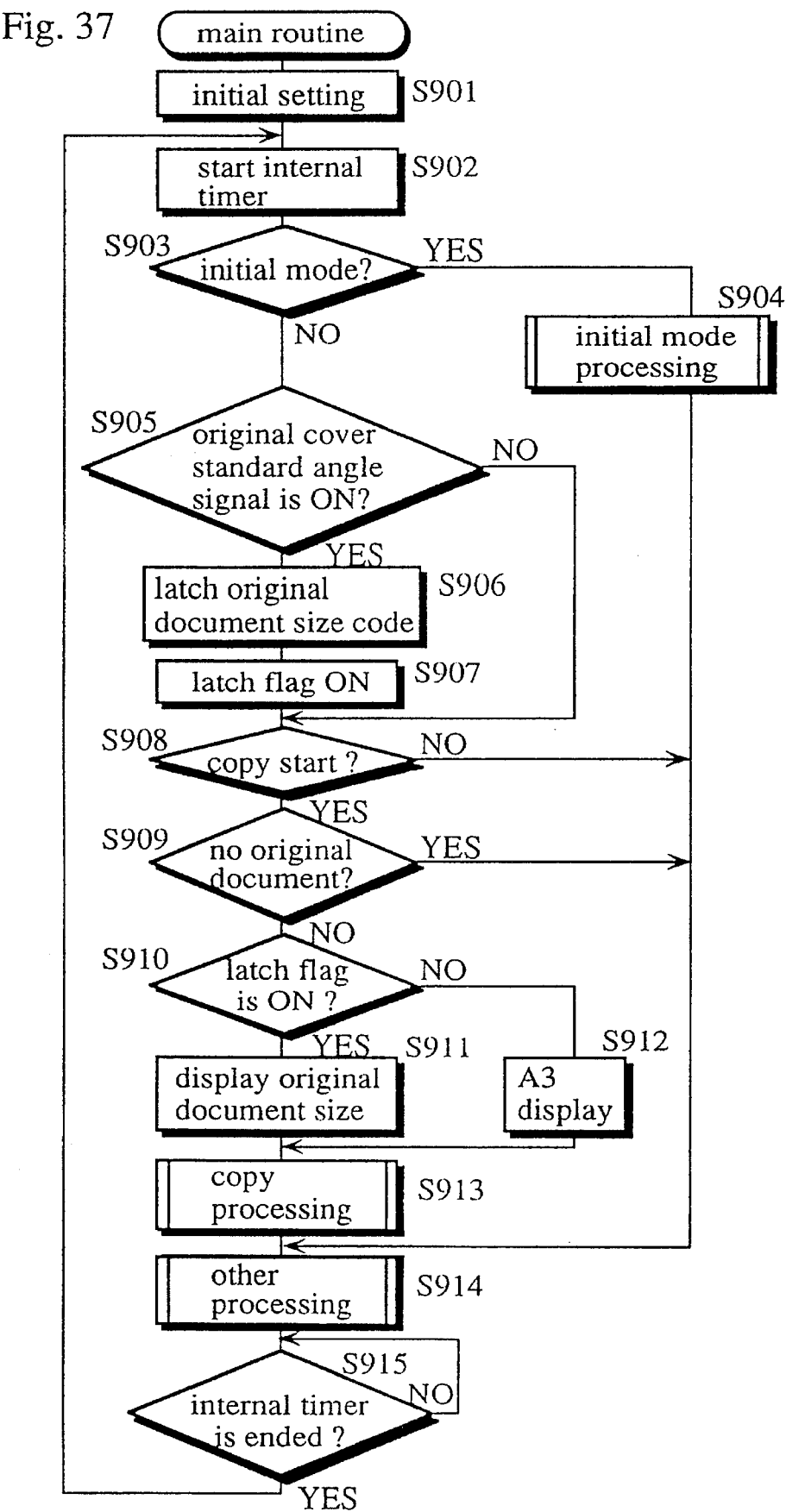
FIG. 37 is a flow chart describing control of a main unit control CPU 2 in the sixth embodiment.

FIG. 37 is a flow chart describing the main routine of the main unit control CPU 2. The operation of copy machine main unit is described as referring to this flow chart.

Various initial settings are implemented (S901), and internal timer starts (S902). Subsequently, it is judged if the user has directed initial mode (by pressing "#" key and start key) (S903). If initial mode has been directed (S904: Yes), initial mode is set active (Low level) and the initial mode processing sub-routine is implemented (S904). This initial mode processing sub-routine is the same as FIGS. 21–24 in the first embodiment.

If initial mode has not been directed (S903: No), document size code is latched according to the following steps S905–912, then copy processing which starts with S913 is operated.

Original document size code DATA0–3 from the CPU 1 is latched (S906) at the timing that standard angle signal from the CPU 1 is set from OFF to ON (at this timing, the original cover 2 which had been opened by more than standard angle is closed to standard angle; also at this timing, S905 is changed from No to Yes). Then, latch flag is set ON to inform that original document size code was latched (S907).

In this way, the size of an original document on the scanning glass 7 is latched (including no document on the same) unless a maximum size document (A3T) is disposed on the scanning glass 7.

When start key is pressed (S908: Yes), it is judged that the user directs copy processing. After confirming that original document size code latched at S906 indicates other than "no paper" (S909: No), the latch flag is examined. If the latch flag is set ON (S910: Yes), original document size is displayed on the liquid crystal display unit LCD according to original document size code latched at S906 (S911), and copy processing is operated according to this original document size code (S913).

If the latch flag is set OFF (S910: No), it is judged that original cover standard angle signal remains OFF at S905. That is, both the output value of the light illuminating a position (3) of the sensor unit FD2 and the output value of the light illuminating a position (7) of the distance sensor unit CD1 are still greater than standard sensor output value. Therefore, it is judged that a maximum size (A3T) original document is disposed on the scanning glass 7, so that A3T original document size is displayed on the liquid crystal display unit LCD (S912), and copy processing is operated according to this original document size (S913).

Thus, with the operation of the CPU 2 stated above, copy processing can be operated with every original document size in FIG. 6. Similarly, copy processing may be operated with original document sizes in FIGS. 7 and 8.

With the original document reading device relating to this embodiment, the opening angle of original cover is detected according to distance information from a distance sensor unit; then the main unit control CPU latches original document size code in response to detected opening angle of original cover.

Therefore, the opening angle of original cover is detected precisely without a photo interpreter or a lead switch, that is with a small number of elements, whereby reliability of the device is improved. The opening angle of original cover is detected precisely, so that it is possible to set smaller standard opening angle of original cover for directing latch of original document size code. In this way, the performance of the device improves. Also, a plurality of distance sensor units for measuring different original document sizes are also employed to detect the opening angle of original cover. Therefore, the opening angle of original cover can be detected without increasing the number of distance sensor units.

Although two of the distance sensor units constructed for measuring original document size are employed to detect the opening angle of the original cover 2 in this embodiment. A different number of distance sensor units may be employed to perform the same function.

Different distance sensor units may be employed for the purpose of measuring original document size and for the purpose of detecting the opening angle of original cover, instead of employing single distance sensor unit for both purposes.

The original cover 2 is opened and closed freely around an axis in this embodiment; however, it may be opened and closed in different manners. For example, original cover may move in parallel to open and close itself.

In the above first through sixth embodiments, a copy machine illuminates image of an original document on a photosensitive drum PC by optical system. A device for converting image of an original document into digital data with a line sensor may be applicable to these embodiments. More specifically, a contact type document reading device which constructs a CCD line sensor on a slider which moves along scanning glass, and reads image of an original document by moving the slider may be applicable. An original document reading device which has a CCD line sensor fixed to itself and has a reflection mirror on a slider, and guides image of an original document into the CCD line sensor via the reflection mirror may be also applicable.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An original document reading device comprising:
    a transparent original document table which has an area onto which an original document is disposed:
    a reading means for reading an image of the original document disposed on the original document table;
    a plurality of distance sensors each for measuring distance as for a certain position of the original document table which corresponds to size of the original document disposed on the original document table, then outputting measuring value;
    a threshold value setting means for setting threshold value according to the measuring value from each distance sensor;
    an original document size deciding means for comparing the measuring value from each distance sensor with the threshold value set by the threshold value setting means, and deciding the size of the original document disposed on the original document table according to data representing the compared result; and
    a reading controlling means for controlling the reading of the reading means according to the decided result from the original document size deciding means.

2. The original document reading device of claim 1, wherein each distance sensor is disposed to measure distance in a direction which is diagonal to the original document table.

3. The original document reading device of claim 1 further comprising an original cover one end of which is attached to one end of the original document table by an axis to enable itself to open and close to the original document table, wherein at least one of the plurality of distance sensors measures distance to the original document table diagonally in a direction being away from the axis.

4. The original document reading device of claim 2 further comprising an original cover one end of which is attached to one end of the original document table to enable itself to open and close to the original document table by an axis, wherein the reading means comprises an optical system which moves along with the original document table; and at least one of the plurality of distance sensors is disposed outside a migration range of the optical system and measures distance to the original document table diagonally in the direction being toward the migration range of the optical system.

5. The original document reading device of claim 1 further comprising an original cover one end of which is attached to one end of the original document table by an axis to enable itself to open and close to the original document table, wherein each distance sensor comprises a plurality of emitting elements and a single sensing element; and the original document size deciding means decides the size of the original document according to distance information from the plurality of distances sensors at least one of which employs the sensed result of the sensing elements when light is transmitted from the emitting element located the farthest to the axis of the original cover among the plurality of emitting elements.

6. The original document reading device of claim 1 further comprising an original document size decision forbidding means for forbidding the deciding operation of the original document size deciding means when the measuring value from any distance sensor exceeds a predetermined value.

7. The original document reading device of claim 1 further comprising an original cover which is disposed to enable itself to open and close to the original document table;
    an original cover open and close detecting means for detecting whether the original cover is opened or closed to the original document table; and
    a threshold value setting forbidding means for forbidding the threshold value setting of the threshold value setting means when the original cover open and close detecting means detects that the original cover is opened.

8. The original document reading device of claim 7 further comprising a notifying means for notifying the opening of the original cover when the original cover open and close detecting means detects that the original cover is opened.

9. The original document reading device of claim 7, wherein the threshold value setting forbidding means further forbids the threshold value setting of the threshold value setting means when at least one of the measuring values from the plurality of the distance sensors exceeds a standard value.

10. The original document reading device of claim 1 further comprising a reading forbidding means for forbidding the reading of the reading means while the threshold value setting means is changing the setting of threshold value.

11. The original document reading device of claim 1 further comprising a threshold value setting forbidding means for forbidding the threshold value setting during the reading operation of the reading means.

12. The original document reading device of claim 1 further comprising a measuring value storing means for storing each measuring value of the plurality of distance sensors when the threshold setting means sets the threshold value;
   a measuring value comparing means for comparing each measuring value which is newly outputted from the plurality of distance sensors with each measuring value stored in the storing means; and
   a threshold value setting controlling means for controlling the threshold value setting means to set threshold value and controlling the measuring value storing means to replace the measuring value stored in the storing means with the measuring value which is newly outputted only when the compared result from the measuring value comparing means represents a difference which is greater than a predetermined level.

13. The original document reading device of claim 1 further comprising a measuring value storing means for storing the measuring values from the plurality of distance sensor which repeat the measuring a plurality of times, wherein the threshold value setting means sets the threshold value according to the predetermined number of measuring values stored in the measuring value storing means.

14. The original document reading device of claim 13, wherein the measuring value storing means stores only the measuring value which is within a predetermined range from the measuring values from the plurality of distance sensor which repeat the measuring the plurality of times.

15. The original document reading device of claim 1 further comprising:
   an original document detecting means for detecting if an original document is disposed on the original document table; and
   a threshold value setting controlling means for controlling the threshold value setting means to set threshold value unless the original document detecting means detects that an original document is disposed on the original document table.

16. The original document reading device of claim 1 further comprising a threshold value setting directing means for directing the threshold value setting means to set threshold value whenever the reading means completes the reading a predetermined time.

17. The original document reading device of claim 1 further comprising an original cover which is disposed to enable itself to open and close to the original document table;
   a second distance sensor which is disposed to face to the original cover for measuring distance to the original cover; and
   an original cover opening amount detecting means for detecting opening amount of the original cover according to information about the distance measured by the second distance sensor, wherein
   the reading controlling means controls the reading of the reading means according to the opening amount of the original cover detected by the original cover opening amount detecting means.

18. The original document reading device of claim 1 further comprising an original cover which is disposed to enable itself to open and close to the original document table; and
   an original cover opening amount detecting means for detecting opening amount of the original cover according to information about the distance measured by the plurality of distance sensors, wherein
   the reading controlling means controls the reading of the reading means according to the opening amount of the original cover detected by the original cover opening amount detecting means.

19. The original document reading device of claim 1 further comprising an original cover which is disposed to enable itself to open and close to the original document table; and
   an original cover opening amount detecting means for detecting opening amount of the original cover; and
   a distance measuring halt means for halting the distance measuring of the distance sensors when the original cover opening amount detecting means detects that the original cover is closed by more than predetermined amount, wherein
   the reading controlling means takes in the size of the original document decided by the original document size deciding means when the original cover opening amount detecting means detects that the original cover is opened by more than predetermined amount.

20. The original document reading device of claim 1, wherein the original document size deciding means decides the size of the original document disposed on the original document table as a maximum of predetermined original document size when every measuring value from the plurality of distance sensors exceeds standard value.

21. An original document reading device comprising:
   a transparent original document table which has an area onto which an original document is disposed:
   a reading means for reading an image of the original document disposed on the original document table;
   a plurality of sensors each for measuring optically as for a certain position of the original document table which corresponds to size of the original document disposed on the original document table, then outputting measuring value;
   a threshold value setting means for setting threshold value according to the measuring value from each sensor;
   an original document size deciding means which comprises a memory for storing the threshold value set by the threshold value setting means and a first CPU for implementing a program for original document size detection, for judging if an original document is disposed on each certain position of the original document table by comparing each measuring value from the plurality of sensors with the threshold value, and deciding size of the original document on the original document table according to the judged result, and outputting data representing the decided size of the original document; and a reading controlling means which comprises a second CPU for implementing a program for original document reading control, for taking in the data representing the decided size of the original document from the original document size deciding means to control the reading means.

22. The original document reading device of claim 21 further comprising a memory for storing a table for corresponding information indicating if the original document is disposed on each of the plurality of certain positions of the original document table to the size of the original document, wherein the original document size judging means decides the size of the original document disposed on the original document table by applying the compared data as for each sensor to the table.

23. The original document reading device of claim 22, wherein each memory has the plurality of tables;

a specific table is selected from the plurality of tables according to user's direction with a table selecting means; and the original document size judging means decides the size of the original document disposed on the original document table by applying the compared data as for each sensor to the table selected by the table selecting means.

24. An original document reading device comprising:

a transparent original document table which has an area onto which an original document is disposed;

an original cover which is disposed to enable itself to open and close to the original document table;

an original cover open and close detecting means for detecting whether the original cover is opened or closed to the original document table;

a reading means for reading an image of the original document disposed on the original document table;

a plurality of distance sensors each for measuring distance as for a certain position of the original document table which corresponds to size of the original document disposed on the original document table, then outputting measuring value;

a threshold value setting means for setting threshold value according to the measuring value from each distance sensor;

an original document size deciding means for comparing the measuring value from each distance sensor with the threshold value set by the threshold value setting means, and deciding the size of the original document disposed on the original document table according to data representing the compared result;

a reading controlling means for controlling the reading of the reading means according to the decided result from the original document size deciding means; and a threshold value setting forbidding means for forbidding the threshold value setting of the threshold value setting means when the original cover open and close detecting means detects that the original cover is opened.

25. An original document reading device comprising:

a transparent original document table which has an area onto which an original document is disposed:

a reading means for reading an image of the original document disposed on the original document table;

a plurality of distance sensors each for measuring distance as for a certain position of the original document table which corresponds to size of the original document disposed on the original document table, then outputting measuring value;

a threshold value setting means for setting threshold value according to the measuring value from each distance sensor;

an original document size deciding means for comparing the measuring value from each distance sensor with the threshold value set by the threshold value setting means, and deciding the size of the original document disposed on the original document table according to data representing the compared result;

a reading controlling means for controlling the reading of the reading means according to the decided result from the original document size deciding means; and a reading forbidding means for forbidding the reading of the reading means while the threshold value setting means is changing the setting of threshold value.

26. An original document reading device comprising:

a transparent original document table which has an area onto which an original document is disposed:

a reading means for reading an image of the original document disposed on the original document table;

a plurality of distance sensors each for measuring distance as for a certain position of the original document table which corresponds to size of the original document disposed on the original document table, then outputting measuring value;

a threshold value setting means for setting threshold value according to the measuring value from each distance sensor;

an original document size deciding means for comparing the measuring value from each distance sensor with the threshold value set by the threshold value setting means, and deciding the size of the original document disposed on the original document table according to data representing the compared result;

a reading controlling means for controlling the reading of the reading means according to the decided result from the original document size deciding means; and a threshold value setting forbidding means for forbidding the threshold value setting during the reading operation of the reading means.

27. An original document reading device comprising:

a transparent original document table which has an area onto which an original document is disposed:

an original cover which is disposed to enable itself to open and close to the original document table;

an original cover opening amount detecting means for detecting opening amount of the original cover;

a reading means for reading an image of the original document disposed on the original document table;

a plurality of distance sensors each for measuring distance as for a certain position of the original document table which corresponds to size of the original document disposed on the original document table, then outputting measuring value;

an original document size deciding means for comparing the measuring value from each distance sensor with the threshold value set by the threshold value setting means, and deciding the size of the original document disposed on the original document table according to data representing the compared result;

a reading controlling means for taking in the size of the original document decided by the original document size deciding means and controlling the reading of the reading means according to the size when the original cover opening amount detecting means detects that the original cover is opened by more than a predetermined amount; and a distance measuring halt means for halting the distance measuring of the distance sensors when the original cover opening amount detecting means detects that the original cover is closed by more than predetermined amount.

28. An original document processing device comprising:

a transparent original document table which has an area onto which an original document is disposed:

a plurality of distance sensors each for measuring distance as for a certain position of the original document table which corresponds to size of the original document disposed on the original document table, then outputting measuring value;

a threshold value setting means for setting threshold value according to the measuring value from each distance sensor;

an original document presence judging means for judging if an original document is disposed on each certain position of the original document table by comparing each measuring value from the plurality of distance sensors with the threshold value set by the threshold value setting means; and an original document size deciding means for deciding the size of the original document disposed on the original document table according to the judged result from the original document presence judging means.

29. The original document processing device of claim 28, wherein each distance sensor is disposed to measure distance in direction which is diagonal to the original document table.

* * * * *

UNITED STATES PATENT AND TRADEMARK OFFICE
CERTIFICATE OF CORRECTION

PATENT NO. : 5,500,725

DATED : March 19, 1996

INVENTOR(S) : Akira Takasu, et al.

It is certified that error appears in the above-indentified patent and that said Letters Patent is hereby corrected as shown below:

In Col. 4, line 53, change "comprising" to --comprise--.

In Col. 6, line 49, change "IPU" to --CPU--.

In Col. 9, line 63, change "3a" to --3b--.

In Col. 27, line 57, before "that", delete "the".

In Col. 32, line 42 (Claim 5, line 9), change "distances" to --distance--.

In Col. 33, line 36 (Claim 13, line 4), change "sensor" to --sensors--.

In Col. 33, line 43 (Claim 14, line 4), change "sensor" to --sensors--.

UNITED STATES PATENT AND TRADEMARK OFFICE
CERTIFICATE OF CORRECTION

PATENT NO. : 5,500,725  Page 2 of 2
DATED : March 19, 1996
INVENTOR(S) : Akira Takasu, et al.

It is certified that error appears in the above-indentified patent and that said Letters Patent is hereby corrected as shown below:

In Col. 36, between lines 56 and 57 (Claim 27, between lines 14 and 15), insert the following new paragraph:

--a threshold value setting means for setting threshold value according to the measuring value from each distance sensor;--

Signed and Sealed this

Seventeenth Day of September, 1996

Attest:

BRUCE LEHMAN

Attesting Officer  Commissioner of Patents and Trademarks